(12) United States Patent
Hanlon

(10) Patent No.: US 9,663,234 B1
(45) Date of Patent: May 30, 2017

(54) AERIAL PACKAGE DELIVERY SYSTEM

(71) Applicant: Amazon Technologies, Inc., Seattle, WA (US)

(72) Inventor: Jon T. Hanlon, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 14/836,112

(22) Filed: Aug. 26, 2015

(51) Int. Cl.
*B64D 17/44* (2006.01)
*B64D 1/12* (2006.01)
*B64D 17/22* (2006.01)
*B65D 5/42* (2006.01)

(52) U.S. Cl.
CPC ............ *B64D 17/44* (2013.01); *B64D 1/12* (2013.01); *B64D 17/22* (2013.01); *B65D 5/4233* (2013.01); *B64C 2201/128* (2013.01)

(58) Field of Classification Search
CPC ... B64D 1/02; B64D 1/08; B64D 1/12; B64D 17/22; B64D 17/62; B64D 17/76; B64D 17/40; B64D 17/42; B64D 17/44
See application file for complete search history.

(56) References Cited

U.S. PATENT DOCUMENTS

| | | | | |
|---|---|---|---|---|
| 2,100,693 A | * | 11/1937 | Irvin | B64D 17/52 244/148 |
| 2,178,551 A | * | 11/1939 | Almgren | A63H 33/20 446/51 |
| 2,206,910 A | * | 7/1940 | McCarroll | B64D 1/02 244/142 |
| 2,492,501 A | * | 12/1949 | Robins | B64D 1/02 244/138 R |
| 2,687,263 A | * | 8/1954 | Frieder et al. | B64D 17/52 244/148 |
| 2,711,870 A | * | 6/1955 | Martin | B64D 17/52 244/149 |
| 2,717,133 A | * | 9/1955 | Gregory | B64D 17/52 244/148 |
| 3,032,303 A | * | 5/1962 | Hatfield | B64D 17/52 244/149 |
| 3,224,714 A | * | 12/1965 | Mulcahy, Jr. | B64D 1/22 244/138 R |
| 3,342,439 A | * | 9/1967 | Behrendt | B64D 1/02 206/521 |

(Continued)

FOREIGN PATENT DOCUMENTS

GB 2532482 A * 5/2016 ............ B64D 1/08

*Primary Examiner* — Joseph W Sanderson
(74) *Attorney, Agent, or Firm* — Lee & Hayes, PLLC

(57) ABSTRACT

Systems and methods for delivering packages via aerial vehicles are disclosed. The system can comprise a label that includes a parachute to enable the packages to be dropped from the aerial vehicle, yet land at the package's destination without damage. The system can include a self-adhesive backing, a plurality of parachute cords, a parachute, and a breakaway cover. The parachute cords can include a shock absorber to reduce the shock on the package of the parachute opening. The parachute and/or the breakaway cover can include graphics to provide address, velocity, or spin information for the package. The parachute cords can include a harness to separate the cords and reduce tangling of the cords and spinning of the parachute canopy with respect to the package.

20 Claims, 16 Drawing Sheets

(56) References Cited

U.S. PATENT DOCUMENTS

| | | | | |
|---|---|---|---|---|
| 3,603,536 A * | 9/1971 | Dochow | ............... | B64D 1/02 |
| | | | | 244/142 |
| 3,690,604 A * | 9/1972 | Guilfoyle | ............... | B64D 17/52 |
| | | | | 244/148 |
| 4,169,568 A * | 10/1979 | Drew | ............... | B64D 17/42 |
| | | | | 206/524.8 |
| 4,577,816 A * | 3/1986 | Foster | ............... | B65D 81/2023 |
| | | | | 206/524.8 |
| 4,577,817 A * | 3/1986 | Hernandez | ............... | B65D 81/2023 |
| | | | | 206/524.8 |
| 4,664,342 A * | 5/1987 | Jones | ............... | B64D 17/60 |
| | | | | 244/147 |
| 5,253,826 A * | 10/1993 | Coltman | ............... | B64D 17/64 |
| | | | | 244/137.3 |
| 5,295,580 A * | 3/1994 | Hicks | ............... | B65D 5/5054 |
| | | | | 206/588 |
| 6,776,374 B2 * | 8/2004 | LaSee | ............... | B64D 17/40 |
| | | | | 244/139 |
| 7,059,570 B2 * | 6/2006 | Strong | ............... | B64D 17/343 |
| | | | | 244/147 |
| 8,091,822 B2 * | 1/2012 | Boyce | ............... | G09F 19/18 |
| | | | | 244/13 |
| 8,091,834 B2 * | 1/2012 | Berland | ............... | B64D 17/025 |
| | | | | 244/142 |
| 9,457,902 B2 * | 10/2016 | Potter | ............... | B64D 1/12 |
| 2011/0133036 A1 * | 6/2011 | Goddard | ............... | B64D 1/16 |
| | | | | 244/137.3 |

* cited by examiner

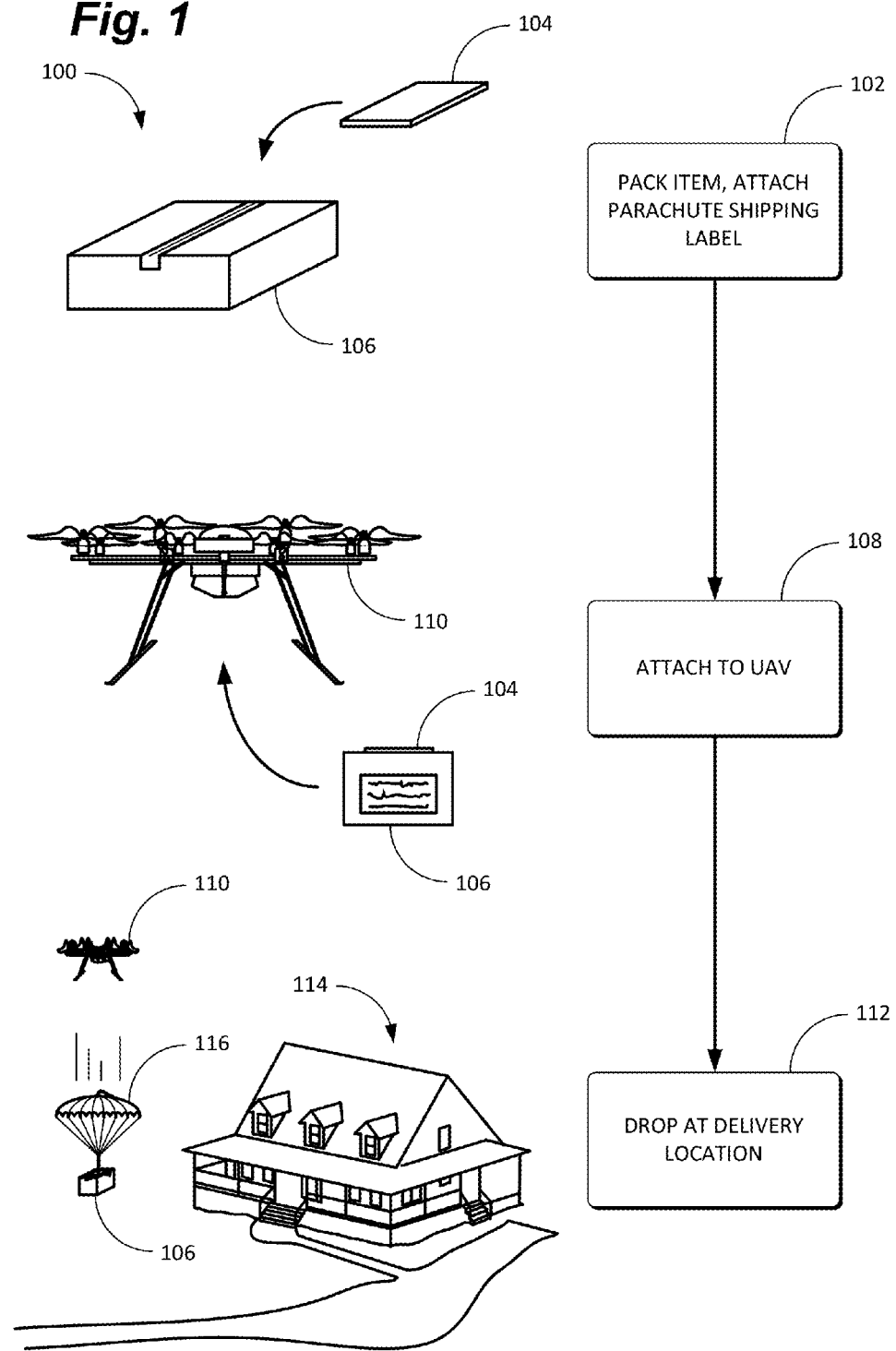

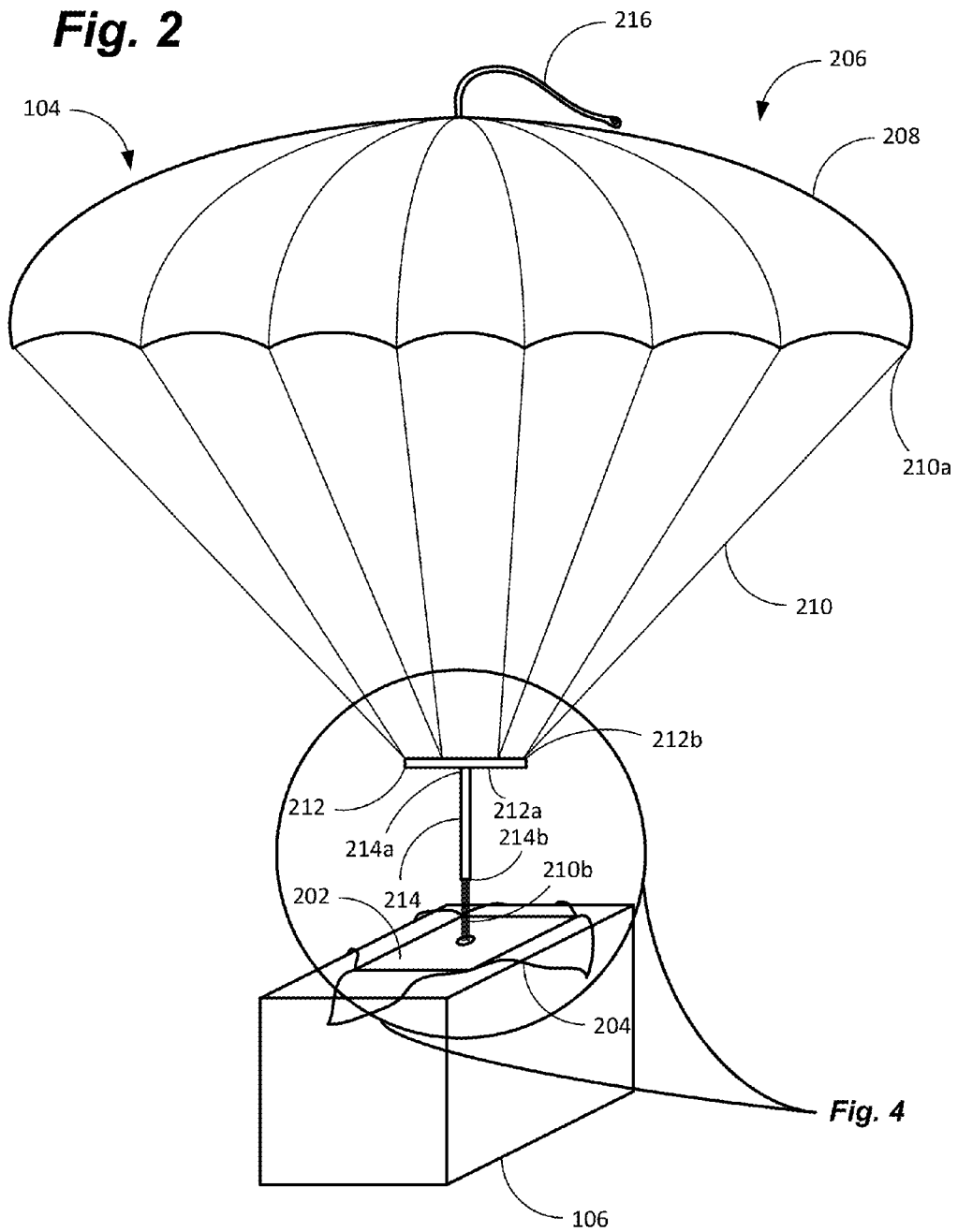

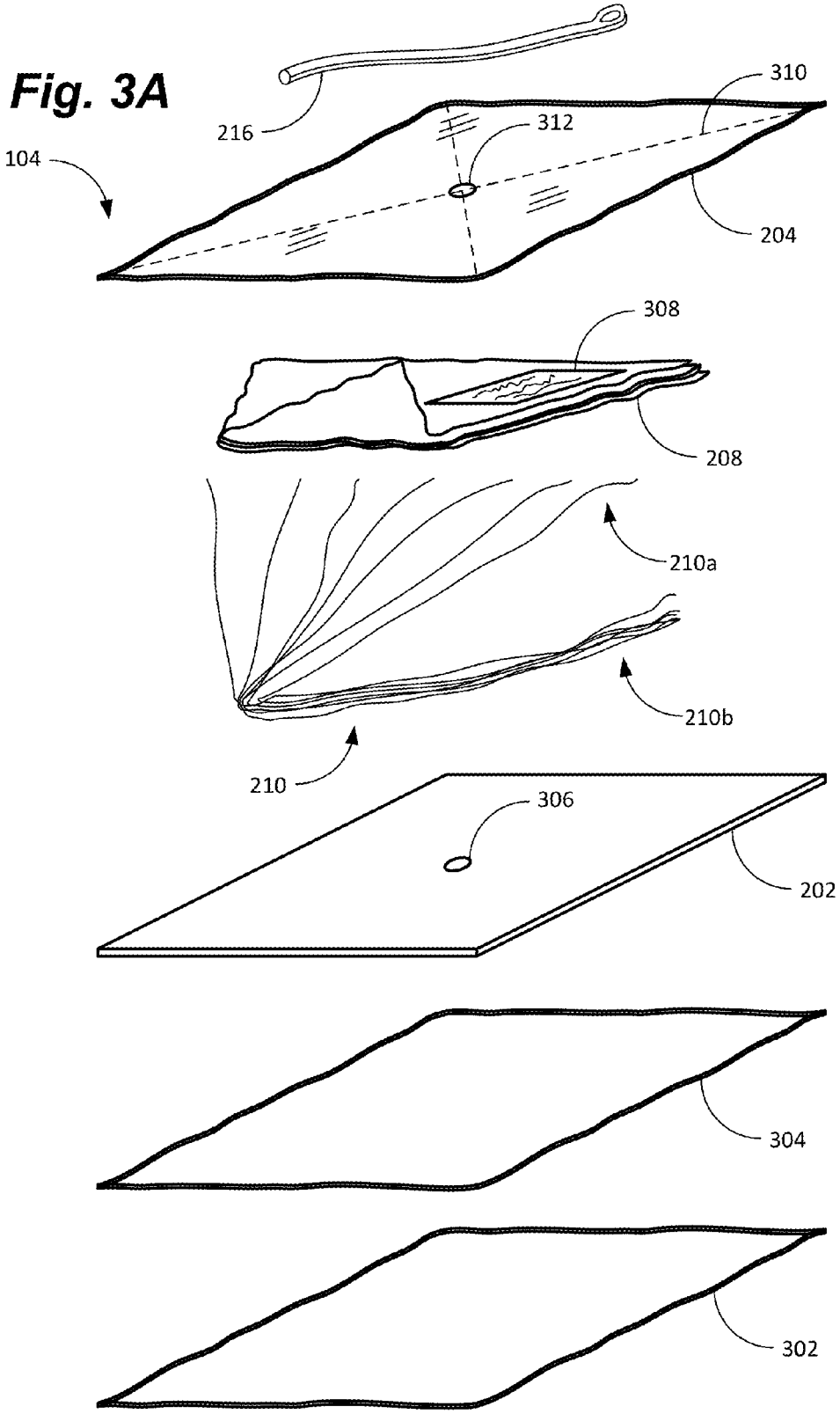

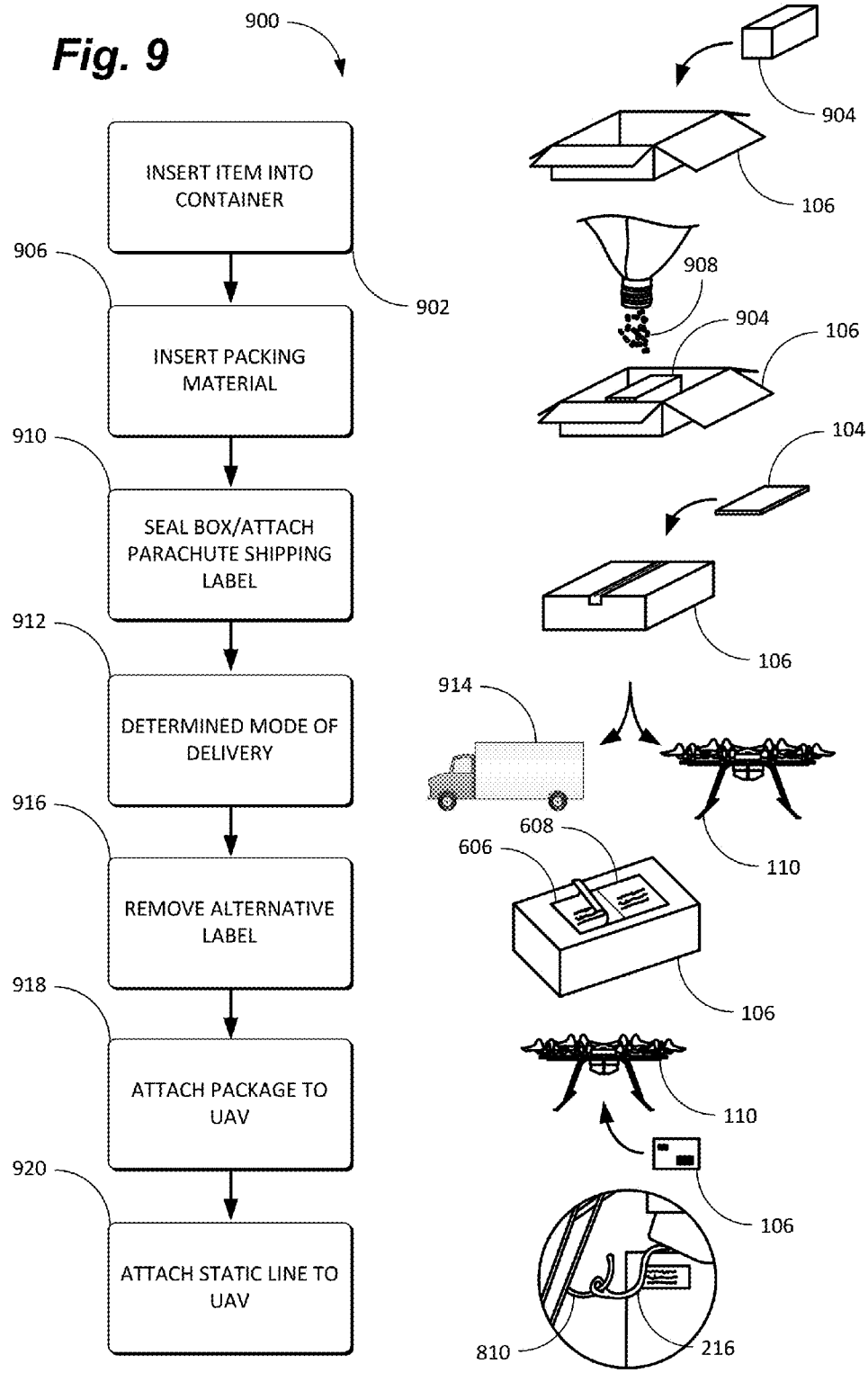

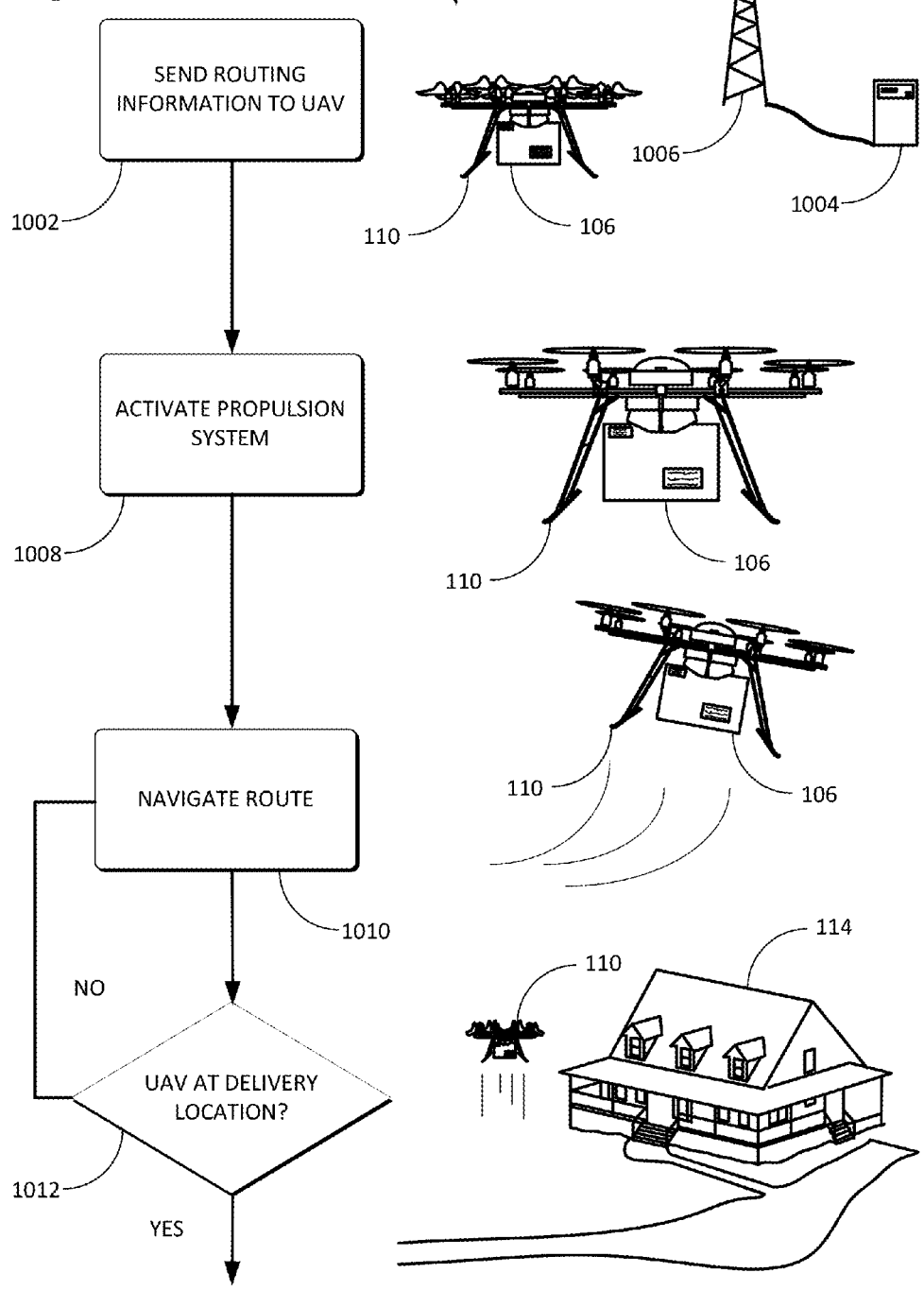

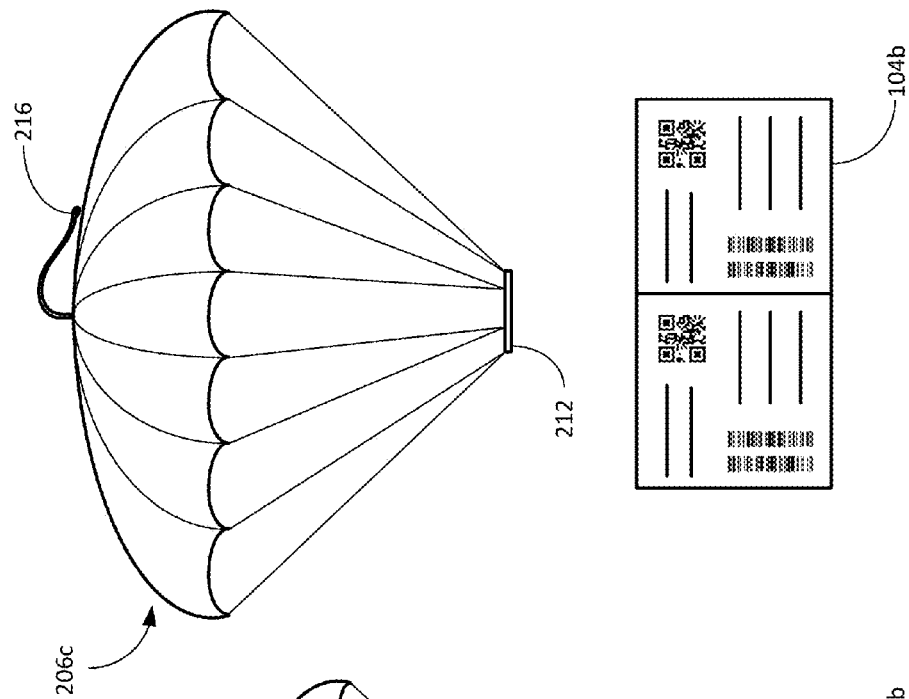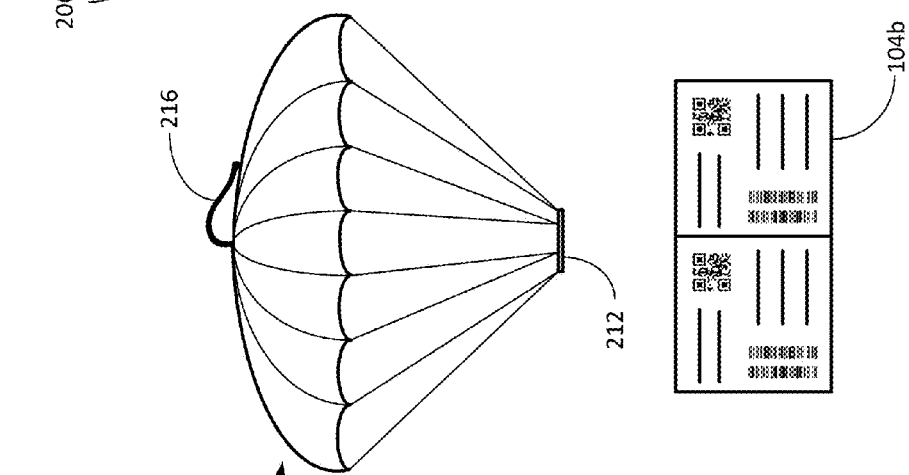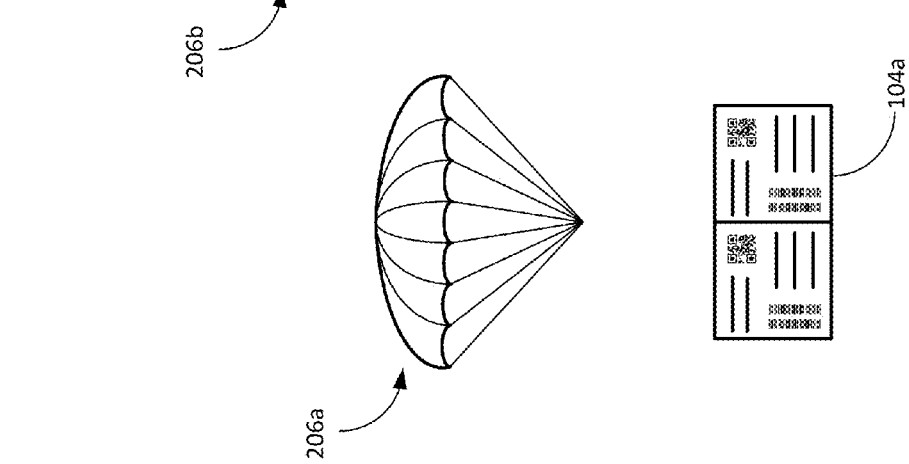

AERIAL PACKAGE DELIVERY SYSTEM

BACKGROUND

Unmanned aerial vehicles (UAVs) comprise a variety of vehicles, from conventional fixed wing airplanes, to helicopters, to ornithopters (i.e., machines that fly like birds), and are used in a variety of roles. They can be remotely piloted by a pilot on the ground or can be autonomous or semi-autonomous vehicles that fly missions using preprogrammed coordinates, global positioning system (GPS) navigation, etc. UAVs also include remote control helicopters and airplanes used by hobbyists.

UAVs can be equipped with cameras to provide imagery during flight, which may be used for navigational or other purposes (e.g., to identify a house address). UAVs can also be equipped with sensors to provide local weather and atmospheric conditions, radiation levels, and other conditions. UAVs can also include cargo bays, hooks, or other means for carrying payloads.

Newer generation UAVs can also provide significant payload capabilities. As a result, UAVs can also be used for delivering packages, groceries, mail, and other items. The use of UAVs for deliveries can reduce costs and increase speed and accuracy. However, landing a UAV at a delivery location may be problematic for multiple reasons, such as the presence of obstacles (e.g., trees, power lines, etc.) and the power requirements of descending and ascending from the delivery location, among other reasons.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 is a pictorial flow diagram of an illustrative process for delivering packages using an unmanned aerial vehicle (UAV) and a shipping label parachute system, in accordance with some examples of the present disclosure.

FIG. 2 is a front, perspective view of a shipping label parachute system in the deployed position attached to a package, in accordance with some examples of the present disclosure.

FIG. 3A is a front, perspective, exploded view of the shipping label parachute system of FIG. 2 in the stowed position, in accordance with some examples of the present disclosure.

FIG. 9 is a pictorial flow diagram of an illustrative process for preparing packages for delivery by a UAV utilizing the shipping label parachute system, in accordance with some examples of the present disclosure.

FIGS. 10A and 10B are pictorial flow diagrams of an illustrative process for delivering packages by a UAV utilizing the shipping label parachute system, in accordance with some examples of the present disclosure.

FIGS. 11A-11C depict front, perspective views of small (FIG. 11A), medium (FIG. 11B), and large (FIG. 11C) parachute systems and front views of small (FIG. 11A) medium (FIG. 11B) and large (FIG. 11C) shipping label parachute systems, in accordance with some examples of the present disclosure.

DETAILED DESCRIPTION

Figure 3B:
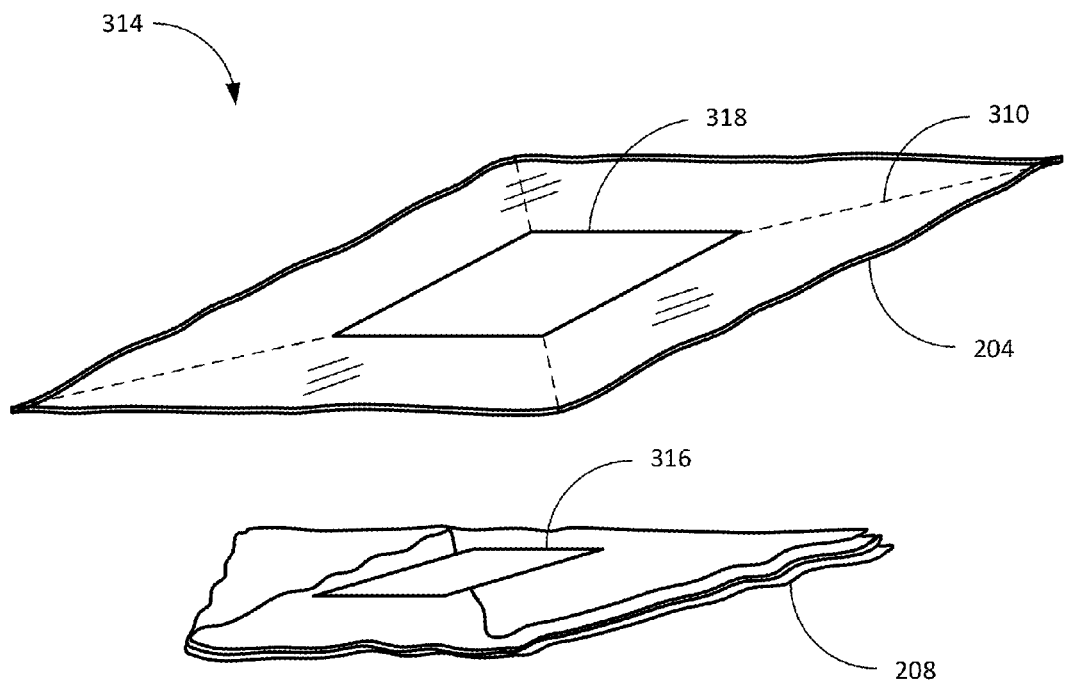
FIG. 3B is a front, perspective, exploded view of the shipping label parachute system with an adhesive static line in the stowed position, in accordance with some examples of the present disclosure.

Examples of the present disclosure relate generally to shipping labels, and specifically to a shipping label parachute system to enable the delivery of packages by unmanned aerial vehicles ("UAVs") or other aerial vehicles. The shipping label parachute system can function as a conventional shipping label and can attach to packages in a conventional manner, but can include parachute components to enable packages to be safely dropped from UAVs, or other aerial vehicles, for delivery. The shipping label parachute system can comprise multiple sizes for delivery of different weight and size packages.

As discussed above, improvements in battery and propulsion system components, among other things, have increased the payload capacity and range of many UAVs. As a result, local delivery of packages and other objects via UAV has become practical. As a result, it may be desirable to have a system and method to enable a package to be dropped from a UAV, or other aerial vehicle, yet have its descent controlled by a parachute, or similar. The system preferably enables the workflow process of shipping and handling to remain substantially unchanged. The system is preferably compact, self-contained, and relatively inexpensive.

To this end, examples of the present disclosure can comprise a shipping label parachute system. The system can comprise a parachute folded to have substantially the same planform as a conventional shipping label. The parachute can be inserted into a packet or envelope comprising an adhesive backing, or similar, to enable the system to be easily attached to a package for delivery. In some examples, the adhesive backing can provide sufficient adhesion between the system and the package to remain attached to the package upon deployment of the parachute and the subsequent descent. The parachute system can include a number of additional features including, but not limited to, a shock absorber, additional identifying features, and a clear, breakaway cover. The packages can be delivered by a UAV, which can include cameras and other sensors to monitor the route if the UAV and the descent of the package, among other things.

As shown in FIG. 1, examples of the present disclosure can comprise a method 100 for delivering packages via a UAV. At 102, a shipping label parachute system 104 can be affixed to a shipping container 106 in the conventional manner. As used herein, the term "shipping container" includes any container used to secure a package, including a conventional cardboard or paper box, but also a soft-sided container, a bag, an envelope, a shipping pouch, cooler, or any other type of rigid or non-rigid container. In some example, the shipping label parachute system 104 can include an adhesive backing to couple or affix the shipping label parachute system 104 to the shipping container 106. In other examples, the shipping label parachute system 104 can be affixed to the shipping container 106 using crimp-on straps, weld-on straps, cables ties, or other means. As discussed below, the shipping label parachute system 104 can include, for example, an adhesive back, a parachute, a breakaway cover, and a static line.

At 108, the shipping container 106, with the shipping label parachute system 104 attached, can be attached to a UAV 110. In some examples, the UAV 110 can include retractable arms, claws, suction cups, pins, hooks, adhesive, or other means to retain the shipping container 106. In some examples, the shipping label parachute system 104 can include straps, or other means, to attach the shipping container 106 to the UAV 110. In some examples, the shipping label parachute system 104 can include a static line attached to the parachute and the UAV 110 to facilitate the opening of the parachute.

At 112, upon arrival at the delivery location 114, the UAV 110 can drop the shipping container 106, thereby deploying the parachute 116. The parachute 116, sometimes in conjunction with the packing material used in the shipping container 106, can enable the contents of the shipping container 106 to be delivered undamaged. In this manner, the UAV 110 can also remain at a safe distance and height from the delivery location 114, reducing the chances of a collision between objects and other items at the delivery location 114.

FIG. 2 depicts the shipping label parachute system 104 in the deployed (i.e., parachute open) position. As shown, the shipping label parachute system 104 can comprise a backing sheet 202 and a breakaway cover 204. In some examples, the backing sheet 202 can comprise, for example, paper or plastic. In some examples, the backing sheet 202 can also include an adhesive backing to enable the shipping label parachute system 104 to be attached to the shipping container 106. In other examples, the backing sheet 202 can be attached to the shipping container 106 using box staples, straps, or other suitable means. In still other means, the backing sheet 202 can include hooks, claws, or other mechanical means to attach the shipping label parachute system 104 to the shipping container 106.

The shipping label parachute system 104 can also include a parachute system 206. The parachute system 206 can comprise a parachute canopy 208. The parachute canopy 208 can comprise a suitably light, strong material such as, for example, paper, plastic, canvas, silk, nylon, Kevlar®, polyester, or combinations thereof. In some examples, different sized parachute canopies 208 can be used for different sized shipping containers 106. The parachute canopies 208 can be sized and shaped to slow a shipping container's 106 descent appropriately to prevent damage to the contents of the shipping container 106. The parachute canopy 208 can be sized according to the weight, size, and/or shape of the shipping container 106 and contents.

In some examples, the parachute canopy 208 may be the same size for shipping containers 106 of the same weight. In other examples, the parachute canopy 208 may be sized differently for shipping containers 106 of the same weight based on the contents. In other words, a shipping container 106 carrying a drinking glass may have a larger parachute canopy 208 than a shipping container 106 carrying a screwdriver simply because the glass is more fragile than the screwdriver and thus, has a lower predetermined landing speed.

Although shown as a conventional, round parachute canopy 208, other canopy shapes could be used. Square or ram air parachute canopies 208 can be used, for example, to enable the package to travel a predetermined distance, for example, when dropped. In other words, rather than traveling substantially vertically downward when deployed, as with the round canopy 208, a square canopy 208 may be used, for example, to provide a predetermined "stand-off" distance for the UAV 110. In this manner, the package could be dropped from a predetermined height and distance from the delivery location 114 and glide forward and downward to the delivery location 114 based on the standard glideslope of the canopy 208.

While described above as a parachute canopy 208, other arresting devices can be used. The parachute canopy 208 can comprise a streamer, for example, such as those used in model rocketry. The parachute canopy 208 can also comprise an auto-rotating propeller, or similar device. A number of additional devices designed to slow the package to the predetermined landing speed could be used and are contemplated herein.

The parachute canopy 208 can be connected, directly or indirectly, to the shipping label parachute system 104 via a plurality of parachute cords 210. The parachute cords 210 can comprise a sufficiently strong material to withstand the opening of the parachute canopy 208 and to support the weight of the shipping container 106. The parachute cords 210 can comprise, for example, nylon, cotton, polyester, Kevlar®, or combinations thereof. In some examples, as discussed below, the parachute cords 210 can connect directly to the shipping label parachute system 104.

In other examples, the parachute cords 210 can connect to the shipping label parachute system 104 via a harness 212 and/or a shock absorber 214. In some examples, the harness 212 can comprise a spreader bar 212a and one or more attachment points 212b for the parachute cords 210. The harness 212 can comprise, for example, plastic, cardboard, aluminum, composite, or combinations thereof. The harness 212 can help separate the parachute cords 210 to prevent tangling of the cords 210 during packing and deployment.

The harness 212 can also prevent twisting between the parachute canopy 208 and the shipping container 106 upon deployment, for example, and during the descent of the shipping container 106. The harness 212 can also reduce deployment time of the parachute canopy 208 by spreading the parachute cords apart and can help prevent failed deployment or partially failed deployment (e.g., "streamers"). While shown as a spreader bar 212a, the harness 212 can comprise many shapes including, but not limited to, circular, ovoid, and rectangular that enable the parachute cords 210 to connect at multiple locations. In some examples, the harness 212 can also comprise multiple pieces.

In other examples, the parachute cords 210 can connect directly to the shipping label parachute system 104 without a harness 212. In this manner, the parachute cords 210 can be attached directly to the backing sheet 202, for example, or sandwiched between the backing sheet 202 and the shipping container 106. The harness 212 may be unnecessary for smaller canopies 208, for example, or for packages using multiple shipping label parachute systems 104. Removal of the harness 212 can enable the parachute cords 210 to be connected directly to the shipping label parachute system 104 and may reduce the stowed size and weight of the system 104 as well as the cost of the system 104.

In some examples, a shock absorber 214 can be disposed between the parachute canopy 208 and the shipping label parachute system 104. The shock absorber 214 can absorb the shock of opening the parachute canopy 208 and can help prevent separation of the parachute canopy 208 from the shipping container 106, damage to contents, and breakage of parachute cords 210, among other things. This can be achieved by preventing the backing sheet 202 from pulling free from the shipping container 106, for example.

The shock absorber 214 can take many forms designed to absorb shock and reduce peak loads by increasing the time interval of a shock event such as the canopy 208 opening. The shock absorber 214 can comprise, for example, one or more strips, strings, or tubes of material in line with the parachute cords 210. The shock absorber 214 can comprise a number of strong, resilient materials including, but not limited to, plastic, rubber, elastic, nylon, or combinations thereof. The shock absorber 214 can also comprise metal or plastic springs and other biasing devices configured to absorb energy. The shock absorber 214 can also comprise tear-away energy absorbing devices that absorb energy through the tearing of material, stitches, or adhesive similar to "screamers" used in mountain climbing, for example. The shock absorber 214 can also comprise one or more concentric tubes with a hydraulic or pneumatic valving system similar to vehicle shock absorbers.

In some examples, a first portion 210a of the parachute cords 210 can be attached to the parachute canopy 208 on one end and then to a first end 214a of the shock absorber 214 on the other. In this configuration, a second end 214b of the shock absorber 214 can be attached directly to the backing sheet 202 and/or the shipping container 106. In other examples, as discussed in greater detail below with reference to FIG. 2C, the shock absorber 214 can be disposed in a middle section of the parachute cords 210, with the first portion 210a of the parachute cords 210 attached at one end to the first end 214a of the shock absorber 214 and a second portion 210b of the parachute cords 210 attached at one end to the second end 214b of the shock absorber 214 and attached at the other end to the backing sheet 202 and/or shipping container 106.

In some examples, the parachute system 206 can further comprise a static line 216. As with larger parachutes, the static line 216 can be attached to the delivery vehicle (e.g., a UAV 110) to enable the parachute canopy 208 to open more quickly upon deployment. This can help to prevent deployment failure and streamers, among other things.

In some examples, the static line 216 can be detachably coupled to the parachute canopy 208 such that, upon deployment, the static line 216 pulls the parachute canopy 208 open, but then detaches from the parachute canopy 208 and remains attached to the UAV 110. In this configuration, the static line 216 may be sewn or taped to the parachute canopy 208 with a thread or tape, for example, which provides sufficient strength to pull the parachute canopy open 208, but then breaks under the weight of the shipping container 106.

In other examples, the reverse may be true, with the static line 216 coupled to the parachute canopy 208 and detachably coupled to the UAV 110 such that, upon deployment, the static line 216 pulls the parachute canopy 208 open, yet remains attached to the parachute canopy 208 and detaches from the UAV 110. In this configuration, the static line 216 may have a loop sewn into one end, which provides sufficient strength to pull the parachute canopy open 208, but then breaks under the weight of the shipping container 106. Similarly, the static line 216 can be attached to a spring-loaded hook, pincer, or loop on the UAV 110 that provides sufficient resistance to open the parachute canopy 208, but then moves or opens to release the static line 216 under the weight of the shipping container 106. In some examples, the static line 216 may be biodegradable, photodegradable, water soluble, or otherwise safely disposable to enable the UAV 110 to drop the static line 216 at some point during its return to the distribution center, for example.

As shown in FIG. 3A, the shipping label parachute system 104 can comprise a number of components that can be flat packed into an envelope-like package. In this manner, the shipping label parachute system 104 can be attached to the shipping container 106 in the conventional manner, much like a standard shipping label. In some examples, the shipping label parachute system 104 can be attached to the shipping container 106 using the same workers and/or machines as "normal" shipping labels, such that the shipping and handling process is essentially unchanged (until delivery begins, as discussed below). In this manner, as discussed below, the shipping label parachute system 104 can include the necessary shipping and handling information such that all shipping containers 106 can include the parachute system 206 regardless of whether they are being delivered by UAV 110. In this manner, the delivery method can be chosen at the time of delivery, rather than during the packing process. This may be useful to account for variable weather conditions, demand, cost, darkness, or other variables in the shipping process.

In some examples, the shipping label parachute system 104 can include the aforementioned backing sheet 202. The backing sheet 202 can act as the base for the shipping label onto which the other components are assembled. In some examples, the backing sheet 202 can also include a protective sheet 302 applied to the first side of the backing sheet 202. The protective sheet 302 can comprise, for example, waxed paper, paper, or plastic. The protective sheet 302 can be used when, for example, the backing sheet 202 includes an adhesive on the first side. In this manner, the protective sheet 302 can be removed from the first side of the shipping label parachute system 104 and the shipping label parachute system 104 can be quickly and easily applied to the shipping container 106.

In some examples, the backing sheet 202 can include a separate adhesive sheet 304. In this configuration, the second side of the adhesive sheet 304 can be adhered to the first side of the backing sheet and the protective sheet 302 can be applied to the adhesive sheet 304. Similar to the configuration above, in this configuration, the protective sheet 302 can be removed from the adhesive sheet 304 and the shipping label parachute system 104 can be quickly and easily applied to the shipping container 106.

The shipping label parachute system 104 can also include a plurality of parachute cords 210. The first portion 210a of the parachute cords 210 can be attached to the parachute canopy 208, while the second portion 210b can be attached to the backing sheet 202 or the shipping container 106. In some examples, as discussed above, the parachute cords 210 can also include a shock absorber 214.

In some examples, the second portion 210b of the parachute cords 210 can be disposed through a first aperture 306 in the backing sheet 202. In this manner, the second portion 210b of the parachute cords 210 can be sandwiched between the backing sheet 202 and the shipping container 106 when the shipping label parachute system 104 is attached to the shipping container 106. In other examples, the second portion 210b of the parachute cords 210 can be sandwiched between the backing sheet 202 and the adhesive sheet 304. In other examples, the second portion 210b of the parachute cords 210 can be sandwiched between the adhesive sheet 304 and the shipping container 106. Regardless of configuration, the parachute cords 210 can be prevented from pulling out of the shipping label parachute system 104 by both friction (i.e., between shipping label parachute system 104 and the shipping container 106) and adhesive.

The parachute canopy 208 can be folded such that it fits in the same, or smaller, area as required for the backing sheet 202. In some examples, the parachute canopy 208 can be folded radially and/or laterally to fit in the required planform. In some examples, the parachute canopy 208 can include a data label 308. The data label 308 can include, for example, address information, quick response (QR) codes, bar codes, or other information. In this configuration, the parachute canopy 208 can be folded such that the data label 308 is visible when the shipping label parachute system 104 is attached to the shipping container 106.

The shipping label parachute system 104 can further comprise a breakaway cover 204. The breakaway cover 204 can comprise, for example, paper or plastic and can be designed to "break away," or tear open, upon deployment of the parachute system 206. In some examples, the breakaway cover 204 can comprise, for example, clear plastic or cellophane to enable the data label 308, or other components, to be visible when the shipping label parachute system 104 is in the stowed position. In some examples, the breakaway cover 204 can include one or more perforations 310 to enable the breakaway cover 204 to tear in a controlled manner upon deployment of the parachute system 206. The perforations 310 can include actual perforations in the breakaway cover 204, score lines, or molded thinner areas, for example, to enable the breakaway cover 204 to tear in a controlled manner.

The shipping label parachute system 104 can also comprise the static line 216 to aid the deployment of the parachute canopy 208. As discussed above, the static line 216 can be attached to the parachute canopy 208 such that it detaches from the parachute canopy 208 and remains with the UAV 110, or vice-versa. In some examples, the static line 216 can be disposed through a second aperture 312 the breakaway cover 204. In this manner, the static line 216 can be attached to the UAV, along with the shipping container 106, for delivery, with the shipping label parachute system 104 still in the stowed position.

Figure 4:
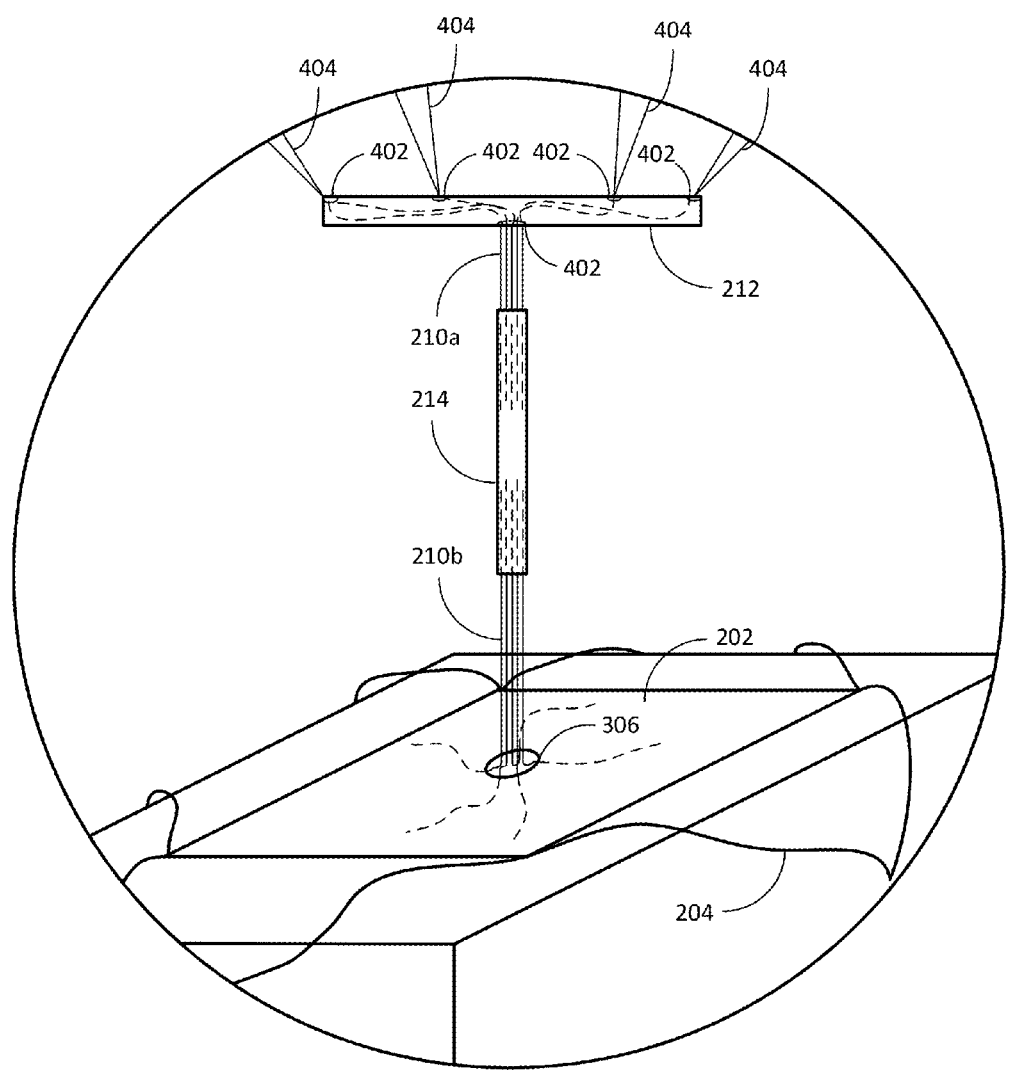
FIG. 4 is a front, perspective, detailed view of the shipping label parachute system of FIG. 2 in the deployed position and showing a harness and shock absorber in greater detail, in accordance with some examples of the present disclosure.

FIG. 4 is a detailed view of the harness 212 and shock absorber 214 components of the parachute system 206. As mentioned above, in some examples, the first portion 210a of the parachute cords 210 can be attached to, or run through, a harness 212, or spreader. The harness 212 can help prevent the tangling of the parachute cords 210 during packing and deployment. The harness 212 can also prevent tangling of the parachute cords 210 during descent by substantially preventing the shipping container 106 from spinning with respect to the parachute canopy 208. As shown, in some examples, the harness 212 can include one or more harness apertures 402 to enable the parachute cords 210 to be routed through the harness and down toward the backing sheet 202.

In other examples, the parachute cords 210 can be attached to the spreader bar 212a of the harness 212, rather than running through it. In this manner, a portion of the parachute cords 210c can be attached to the top of the spreader bar 212a, while another portion 210b can be attached to the bottom of the spreader bar 212a and the shock absorber 214, discussed below. The parachute cords 210 can be mechanically affixed (e.g., tied, fastened, or adhered) to the spreader bar 212a. In some examples, the spreader bar 212a can include a plurality of eyelets, or other means, for this purpose.

In some examples, the parachute system 206 can also include a shock absorber 214. The shock absorber 214 can be disposed between the parachute canopy 208 and the shipping container 106 to absorb the shock of the initial opening of the parachute canopy 208 and bouncing, or other disturbances, during descent. In some examples, one end of the first portion 210a of the parachute cords 210 can be attached to the parachute canopy 208 and the other end can be attached to a first end 214a of the shock absorber 214. In this configuration, a second end 214b of the shock absorber 214 can be attached to the backing sheet 202 and/or the shipping container 106 (not shown).

As shown in FIG. 3B, in some examples, rather than using a static line 216, the shipping label parachute system 104 can use an adhesive static line system 314. In this configuration, the parachute canopy 208 can comprise an adhesive patch 316. The adhesive patch 316 can comprise, for example, an adhesive sheet, similar to the adhesive sheet 304 used on the backing sheet 202. In other examples, the adhesive patch 316 can comprise a hook and loop material, for example, or other material capable of creating an adhesive force sufficient to pull the parachute canopy 208 open when the shipping container 106 is dropped.

In some examples, the breakaway cover 204 can comprise a window 318 to enable contact between the adhesive patch 316 and the UAV 110. In this manner, when the UAV 110 drops the package, the adhesive patch 316 can act like a static line 316. In other words, the adhesion between the adhesive patch 316 and the UAV 110 can be sufficient to open the parachute canopy 208, while still allowing the package to drop free of the UAV 110 afterwards. The adhesive static line system 314 can open the parachute canopy 208, while obviating the need for a static line 216 and the need to attach the static line 216 to the UAV 110 during packaging and/or recover the static line 216 after use. This can decrease handling time when shipping a package and can address any possible issues introduced by the recovery and/or entanglement of static lines 216.

In other examples, as shown in FIG. 4, the shock absorber 214 can be disposed in a middle portion of the parachute cords 210. In other words, the parachute cords 210 can be cut in the middle and the shock absorber 214 can be inserted between the first portion 210a and the second portion 210b of the parachute cords. Thus, the one end of the first portion 210a of the parachute cords 210 can be attached to the parachute canopy 208 and the other end attached to one end of the shock absorber 214. The second portion 210b, in turn, can be attached on one end to the other end of the shock absorber 214 and on the other end to the backing sheet 202 and/or the shipping container 106.

In this manner, the shock absorber 214 can be added during manufacture, as necessary, without disturbing the basic architecture of the parachute system 206. In other words, for some shipping label parachute systems 104, the parachute cords 210 can be attached directly to the backing sheet 202 and/or the shipping container 106, for example; while, in other cases, the parachute cords 210 can be cut in the middle and the shock absorber 214 can be inserted. The shock absorber 214 can be welded, stapled, or adhered (e.g., using epoxy, hot glue, etc.) to the parachute cords 210.

In still other examples, the function of the shock absorber 214 can be included in the parachute cords 210. In other words, in some examples, the parachute cords 210 can contain sufficient elasticity to serve the function of the shock absorber 214 to obviate the need for a separate shock absorber 214. Similarly, as discussed above, in some instances the harness 212 may be unnecessary. To this end, in some examples, the parachute cords 210 can be attached to the backing sheet 202 and/or the shipping container 106 as shown, while in other cases, the parachute cords 210 can be attached to the backing sheet 202 and/or the shipping container 106 in multiple locations to effectively serve as a harness 212. In other examples, such as on relatively small parachutes (e.g., for small, light shipping containers 106), for example, the function of the harness 212 may simply be unnecessary enabling the attachment of all parachute cords 210 to a single location on the backing sheet 202 and/or the shipping container 106.

Figure 5:
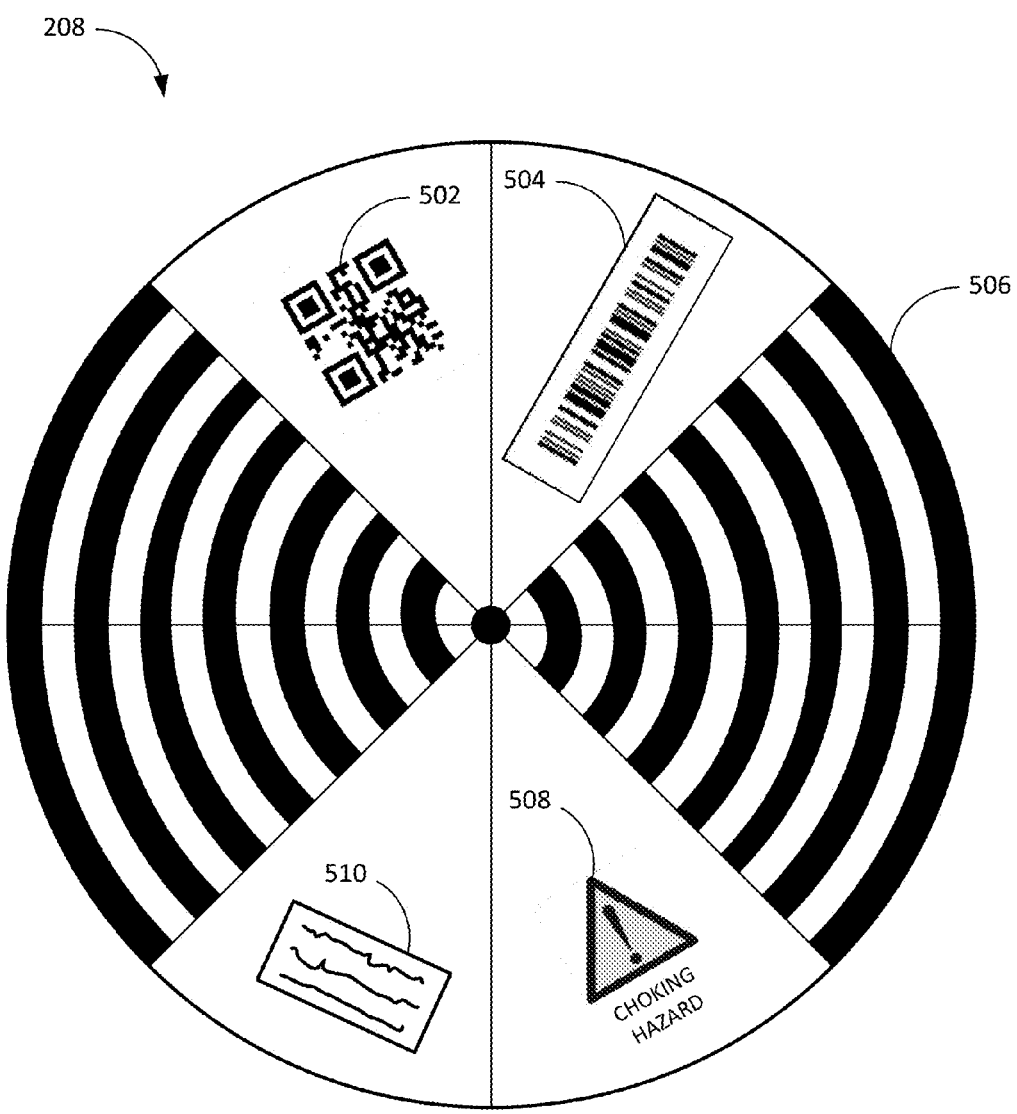
FIG. 5 is a top plan view of a parachute canopy for the shipping label parachute system of FIG. 2 in the deployed position and showing a plurality of additional identifying features, in accordance with some examples of the present disclosure.

As shown in FIG. 5, in some examples, the parachute canopy 208 can comprise a number of additional identifying features including, but not limited to, QR codes 502, bar codes 504, patterns 506, warning labels 508, and/or address labels 510. In some examples, the parachute canopy 208 can be folded such that one or more of these identifying features is visible through the breakaway cover 204 when the parachute system 206 is in the stowed position. In this manner, the parachute canopy 208 can serve as the bill of lading, for example, or can provide the address, shipping information, or other information, for the package while the parachute system 206 is in the stowed position. In other words, one or more of the identifying features can be visible through the breakaway cover 204 in the stowed position.

In some examples, the parachute canopy 208 can comprise, for example, one or more QR codes 502 and/or bar codes 504. The QR codes 502 and/or bar codes 504 can include information related to the parachute system 206 (e.g., maximum weight and/or size capacities), for example, the shipping container 106, the contents of the shipping container 106, the shipping center, and/or the delivery address of the shipping container 106. In some examples, the QR code 502 can include information related to the maximum payload for the parachute system 206, for example. In this manner, as the shipping container 106 is being prepared for shipment and weighed, the QR code 502 can confirm that the correct shipping label parachute system 104 has been affixed to the shipping container 106 for the weight of the package.

In some examples, the parachute canopy 208 can also include one or more patterns 506. In some examples, the patterns 506 can comprise a geometric, random, or other pattern to enable measurement of the movement of the parachute system 206 upon deployment. In some examples, the pattern 506 can be viewed by a camera, or other detection device, on the UAV 110 to detect the spin and/or descent rate of the parachute canopy 208, for example, as is descends. In this manner, if the recipient of package claims that the package, equipment on the ground, people or animals were adversely impacted during delivery, for example, the manner in which the package descended can be reviewed to determine if the descent was the cause of the damage.

In some examples, the parachute canopy 208 can also include one or more warning labels 508. The warning labels 508 may include warnings about choking or suffocation, similar to a dry cleaning bag, for example, or regarding the proper disposal of the parachute canopy 208 (e.g., recycling information). Finally, the parachute canopy 208 can also include an address label 510. The address label 510 can include the return and destination address, for example, the method of shipment, and the weight of the shipping container 106. In some examples, the address label 510 can also include tracking bar codes, or other information, relevant to shipping the package.

In still other examples, the parachute canopy 208 can include one or more advertisements, flyers, or other marketing materials. In some examples, the parachute canopy 208 can comprise coupons, for example, to encourage additional orders from the delivery customer. In other examples, the parachute canopy 208 can include "deals of the day (or week)." In still other examples, targeted advertising space can be sold on the parachute canopies 208. In other words, based on the recipient's order, advertising can be included on the parachute canopy 208 focused toward the recipient's apparent interested based on the current order.

Figure 6A:
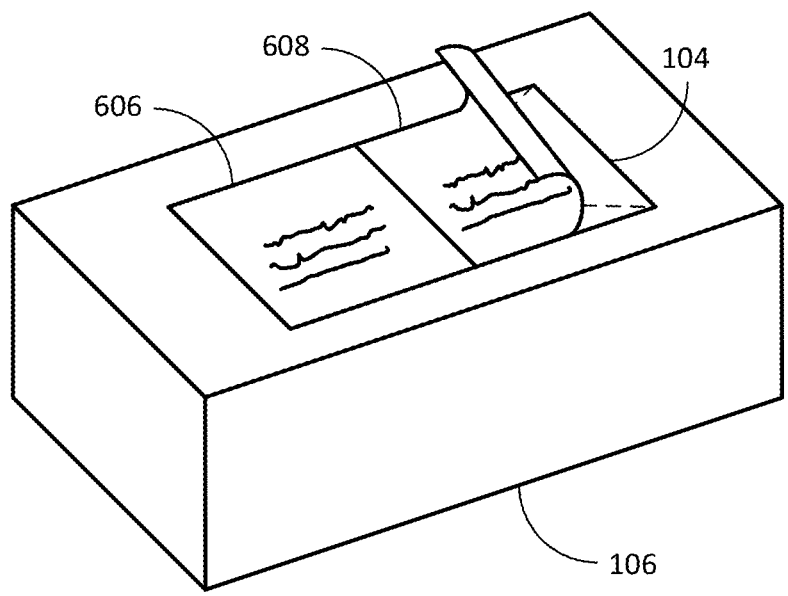
FIG. 6A is a front, perspective views of a shipping label parachute system of FIG. 2 in the stowed position including two address labels attached to a shipping container using an adhesive backing or adhesive sheet, in accordance with some examples of the present disclosure.

As shown in FIG. 6A, in some examples, the shipping label parachute system 104 may be adhered to the shipping container 106 using a suitable tape or adhesive. In this configuration, the tape or adhesive can be of sufficient strength to maintain the connection between the parachute system 206 and the shipping container. In this manner, the shipping label parachute system 104 with the parachute system 206 can simply be attached to the shipping container 106 in the same manner as a conventional shipping label.

Figure 6B:
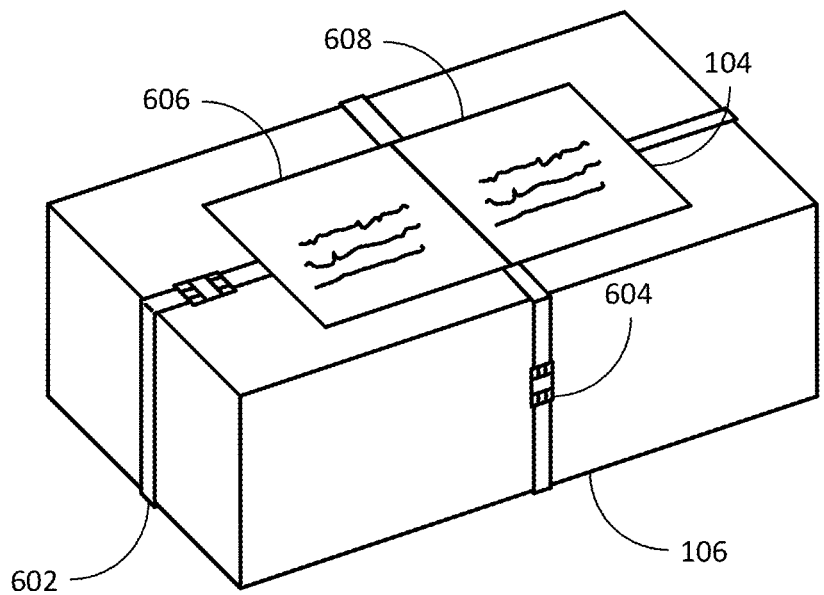
FIG. 6B is a front, perspective views of a shipping label parachute system of FIG. 2 in the stowed position including two address labels attached to a shipping container using a plurality of straps, in accordance with some examples of the present disclosure.

As shown in FIG. 6B, in other examples, the shipping label parachute system 104 may be attached to the shipping container 106 using one or more straps 602 and fasteners 604. In some examples, the straps 602 may be conventional polypropylene or steel straps and the fasteners 604 can be conventional crimp connectors. In this manner, the shipping label parachute system 104 can be attached to the shipping container using conventional packaging equipment. In still other examples, the shipping label parachute system 104 can include barbs, staples, or other means instead of, or in addition to, the aforementioned adhesives and straps to mechanically attach the shipping label parachute system 104 to the shipping container 106.

In some examples, as shown in FIGS. 6A and 6B, the shipping label parachute system 104 can also include one or more shipping labels 606, 608. In some examples, the shipping labels 606, 608 can be applied to a top surface of the breakaway cover 204. In other examples, the shipping labels 606, 608 can be placed below the breakaway cover 204 and be visible through the clear breakaway cover 204. In still other examples, the shipping labels 606, 608 can be printed on the parachute canopy 208. In this configuration, the parachute canopy 208 can be folded such that the shipping labels 606, 608 are visible through the breakaway cover 204 in the stowed position.

In some examples, the shipping labels 606, 608 can be adhered to the breakaway cover 204 such that they can be easily peeled off (e.g., using a removable adhesive). In this manner, a first shipping label 606 can contain shipping information for a first mode of transportation, for example, and a second shipping label 608 can contain shipping information for a second mode of transportation. In this manner, the mode of shipping can be selected at the actual point of shipping by simply removing the shipping label 606, 608 for the appropriate (e.g., non-selected) shipping mode. As discussed below, this can enable the mode of transportation to be selected at the time of shipping based on demand, weather, weight, and cost, among other things.

Figure 7A:
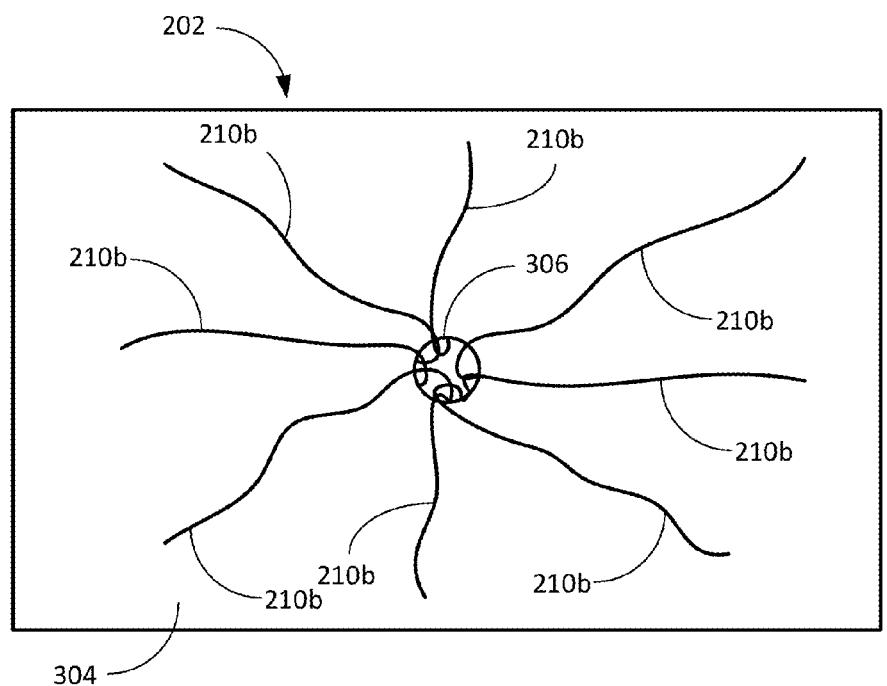
FIG. 7A is bottom plan view of the shipping label parachute system of FIG. 2 with a plurality of parachute cords attached to a backing sheet in a substantially radial pattern, in accordance with some examples of the present disclosure.
Figure 7B:
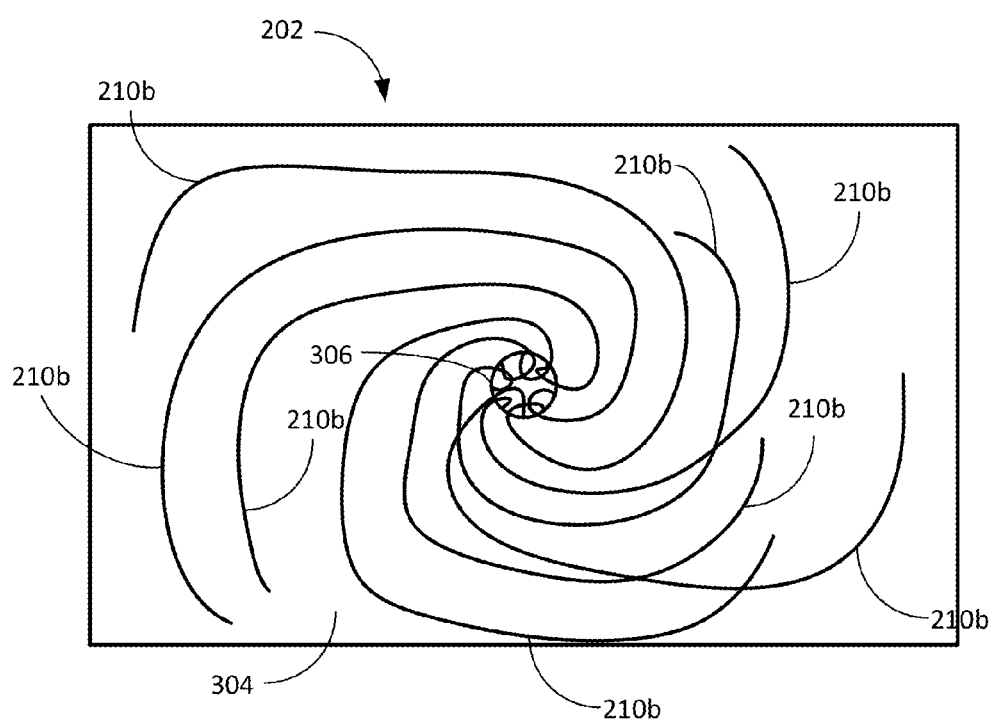
FIG. 7B is bottom plan view of the shipping label parachute system of FIG. 2 with the plurality of parachute cords attached to the backing sheet in a substantially spiral pattern, in accordance with some examples of the present disclosure.

As shown in FIGS. 7A and 7B, in some examples, the parachute cords 210 can be used to secure the parachute system 206 to the shipping label parachute system 104 and/or the shipping container 106. As discussed above, in some examples, the backing sheet 202 can include adhesive on one side. In some examples, the backing sheet 202 can include a separate adhesive sheet 304. In other examples, the adhesive can simply be applied to the first side of the backing sheet 202.

Regardless, as shown in FIG. 7A, in some examples, the parachute cords 210 can be inserted through the first aperture 306 in the backing sheet 202 and then splayed in a substantially radial manner. When the shipping label parachute system 104 is applied to the shipping container 106, therefore, the parachute cords 210 can be trapped between the backing sheet 202 and the shipping container 106 and further secured by the adhesive (or adhesive sheet 304). In this manner, the surface contact between the ends of the second portion 210b of the parachute cords 210 and the backing sheet 202 is increased, increasing the force required to pull the parachute cords 210 out during deployment and descent.

Similarly, as shown in FIG. 7B, the second portion 210b of the parachute cords 210 can be arranged in a spiral pattern. This can further increase the surface contact between the ends of the parachute cords 210 and the backing sheet 202. This may be useful for particularly heavy boxes, for example, that use larger parachute canopies 208 and thus, place additional stress on the parachute cords 210. This may also be useful for smaller parachute canopies 208 that, in turn, use smaller parachute cords 210, simply to increase the contact area between the parachute cords 210 and the backing sheet 202 and/or shipping container 106.

Figure 7C:
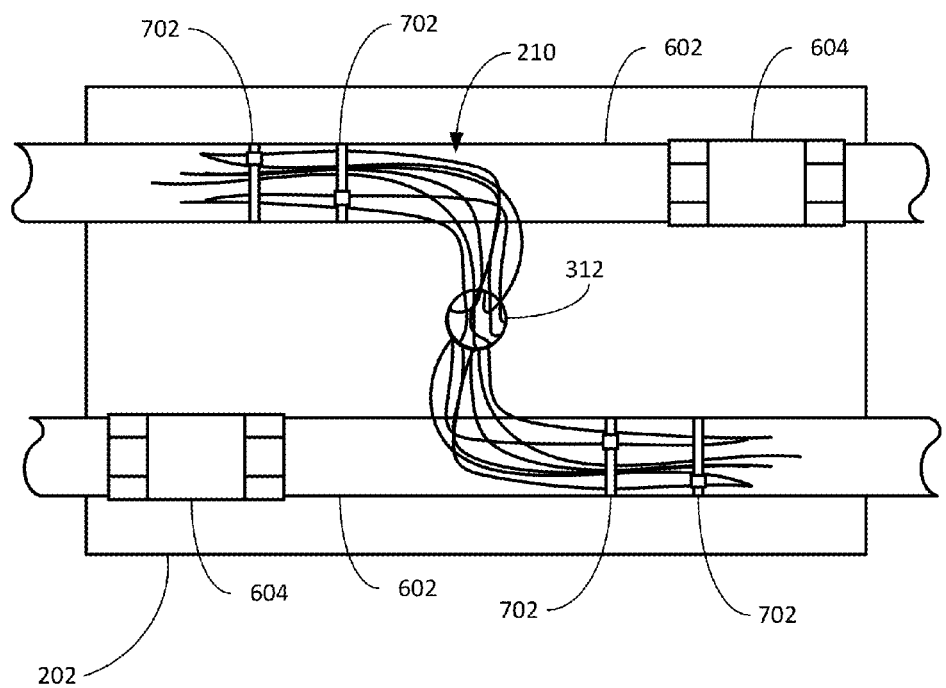
FIG. 7C is bottom plan view of the shipping label parachute system of FIG. 2 with the plurality of parachute cords attached to the shipping container using one or more straps, in accordance with some examples of the present disclosure.

In still other examples, as shown in FIG. 7C, the shipping label parachute system 104 may be attached to the shipping container 106 using one or more straps 602 and fasteners 604. As mentioned above, in some examples, the straps 602 may be conventional polypropylene or steel straps and the fasteners 604 can be conventional crimp connectors. In this configuration, the parachute cords 210 can be attached to the straps to provide a mechanical connection to the shipping container 106.

In some examples, the parachute cords 210 can be tied to the straps 602. In other examples, the parachute cords 210 can be attached to the straps 602 using cable, or "zip," ties 702, staples, twist ties, or other suitable means. In still other examples, the parachute cords 210 may be glued to the straps 602 during assembly of the shipping label parachute system 104. In yet other examples, the parachute cords 210 may be stapled to the shipping container 106 prior to attaching the adhesive sheet 304 to the shipping container 106. In any of these configurations, the shipping label parachute system 104 is provided with a mechanical bond, an adhesive bond, or both between the parachute cords 210 and the shipping container 106 further reducing the likelihood the parachute cords 210 pulling away from the shipping container 106 during the descent.

Figure 8A:
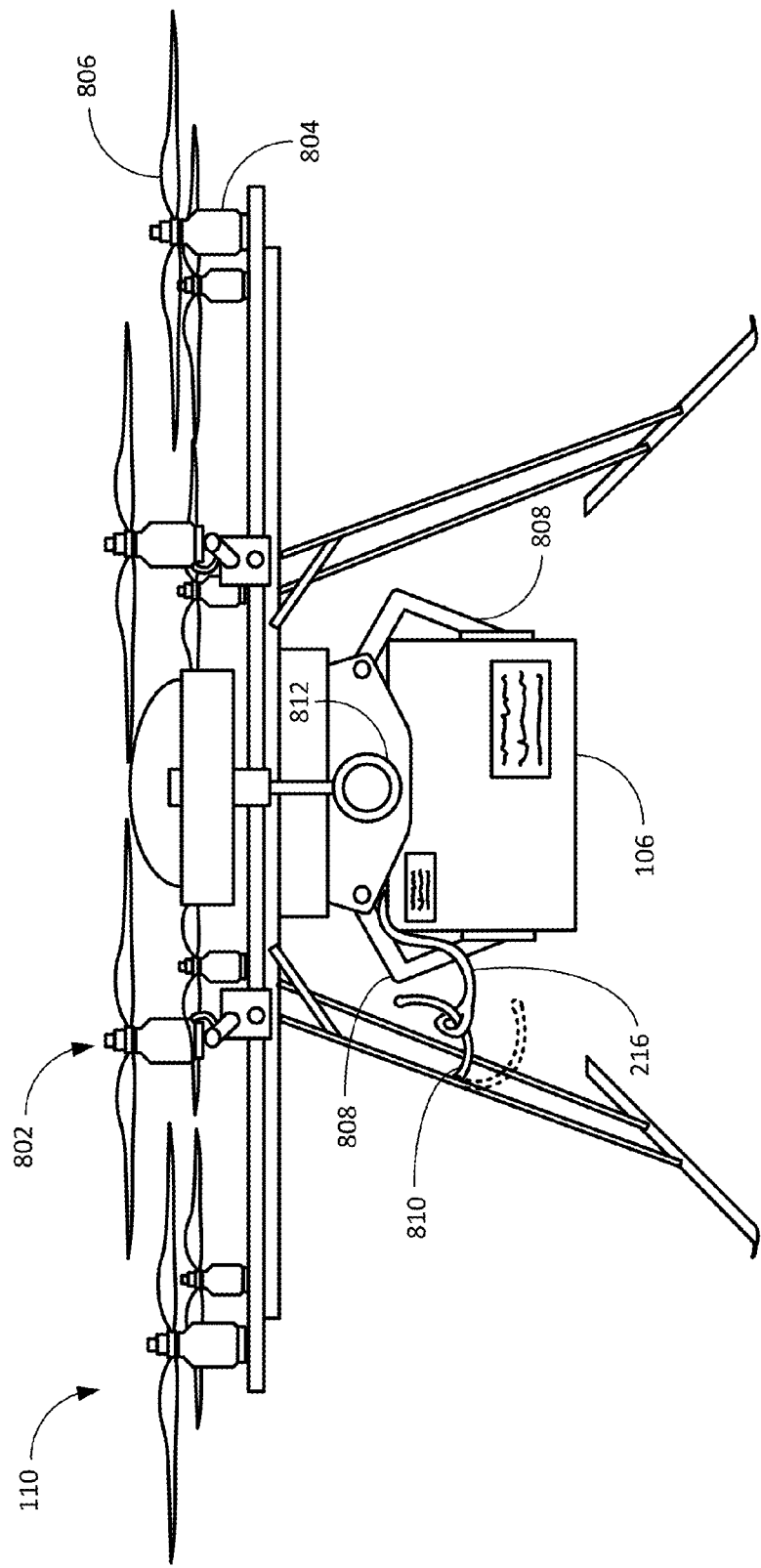
FIG. 8A is a front, perspective of an illustrative UAV for use with the shipping label parachute system of FIG. 2 to deliver packages, in accordance with some examples of the present disclosure.

As discussed above, shipping containers 106 using shipping label parachute system 104 can be delivered using a variety of aerial vehicles including, but not limited to, airplanes, helicopters, and UAVs. A non-limiting example of a UAV is shown in FIG. 8A. In some example, the UAV 110 can include an onboard propulsion system 802, which can include one or more motors or engines 804 driving propellers 806. The UAV 110 can include the required processing and navigation power to receive instructions and travel from a pick-up location (e.g., a shipping or distribution location) to the delivery location (e.g., a home or business). In some examples, the UAV 110 may simply receive "turn-by-turn" directions from a central control system.

The UAV 110 can carry the shipping container 106 in a number of ways. In some examples, as shown, the UAV 110 can include mechanical arms 808 to grip the shipping container 106 on the sides. In other examples, the UAV 110 can include, for example, a suction system, magnet, or retractable shelf to carry the shipping container 106. In still other examples, the shipping container 106 can include straps 602, handles, loops, hooks, Velcro®, or other means to enable the UAV 110 to carry the shipping container 106.

In some examples, the UAV 110 can also include a hook 810 for engagement with the static line 216 (when applicable). As discussed above, the hook 810 can provide the necessary pulling force on the static line 216 to open the parachute canopy 208 when the shipping container 106 is dropped from the UAV 110. In some example, the static line 216 can detach from the parachute canopy 208 and remain on the hook 810. In this manner, the static line 216 can be returned to the distribution location for reuse, recycling, or disposal.

In other examples, the hook 810 can be spring-loaded. In this manner, when the shipping container 106 is dropped, the hook 810 provides the necessary tension to deploy the parachute canopy 208, but then pivots downward under the weight of the shipping container 106 to release the static line 216. In this manner, the static line 216 can remain with the shipping container 106, reducing drag and the possibility of entanglement with the UAV 110, among other things. Although shown and described as a hook, the hook 810 can also comprise other mechanical or electro-mechanical means for holding the static line 216 such as, for example, a snap ring, pincer, or servo designed to retain the static line 216 until deployment.

The UAV 110 can further comprise a sensor system 812. In some examples, the sensor system 812 can comprise one or more cameras. The UAV 110 can include a camera, for example, for use during navigation and to enable the UAV 110 to record and/or analyze the descent of the shipping container 106, among other things. In some examples, the sensor system 812 can also be used to verify, for example, the descent path, landing location, and attitude of the package on the ground (e.g., to determine if the package landed on its side). In some examples, the sensor system 812 can also be used to verify addresses, locate landmarks, relay traffic information, etc.

In some examples, the sensor system 812 can comprise stereoscopic cameras, for example, to enable the system to calculate the position and/or descent rate of the shipping container 106 after deployment. In other examples, the sensor system 812 can include, for example, radar or sonar sensors for this purpose. In this manner, if a package is damaged during delivery, the descent of the package from the UAV to the delivery location can be confirmed or eliminated as the source of the damage. In some examples, the sensor system 812 can work in concert with patterns 506 disposed on the parachute canopy 208 to determine descent rate, descent angle, and spin of the parachute canopy 208, among other things.

Figure 8B:
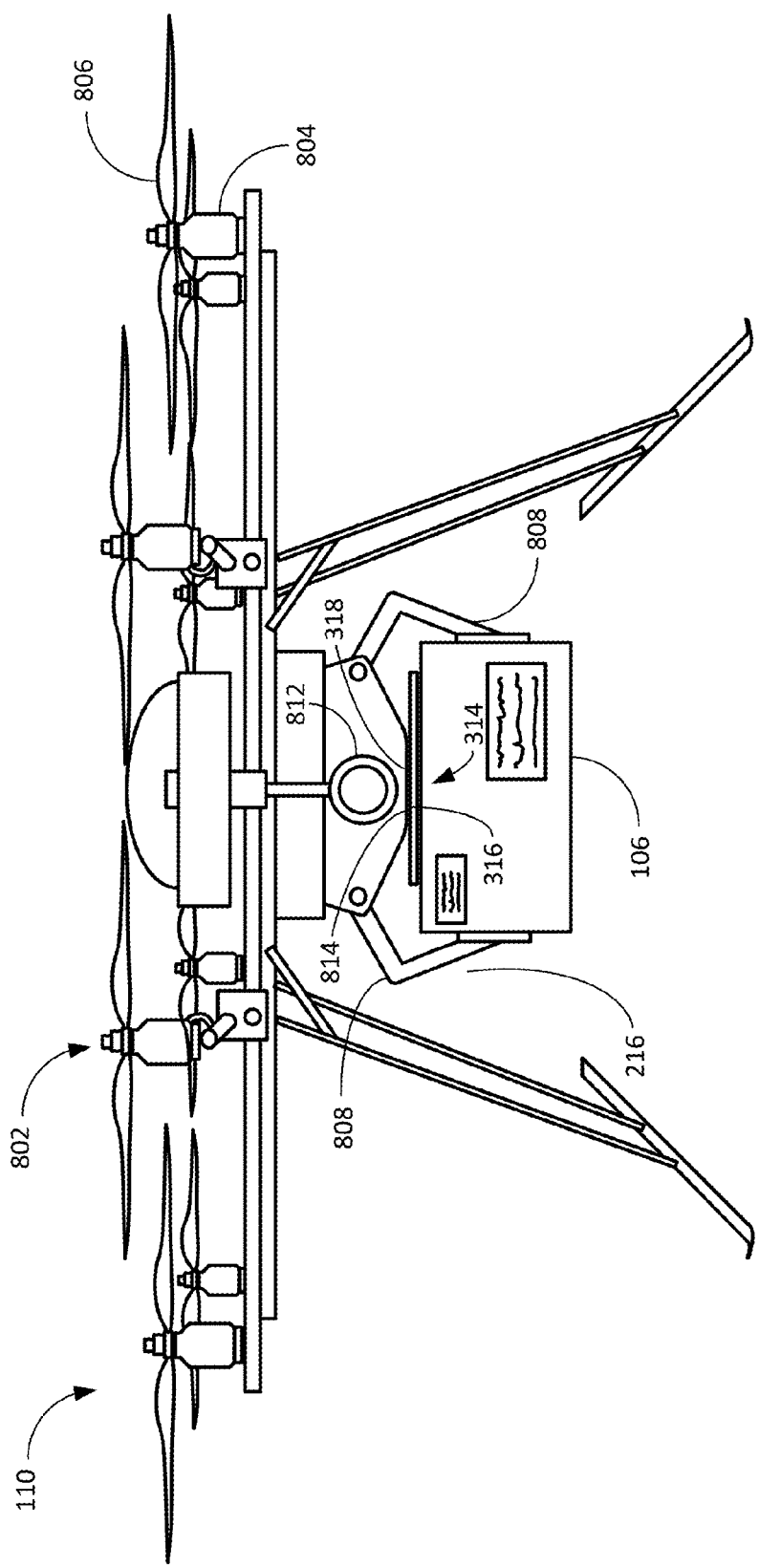
FIG. 8B is a front, perspective of an illustrative UAV for use with the shipping label parachute system with an adhesive static line, in accordance with some examples of the present disclosure.

As discussed above, and shown in FIG. 8B, in some examples, the shipping label parachute system 104 can comprise an adhesive static line system 314. In this configuration, an adhesive patch 316 can be in contact with a surface 814 on the UAV 110. As the name implies, the adhesive patch 316 can literally be a piece of adhesive paper, or other sticky surface, configured to stick to the surface 814 of the UAV 110. In other examples, the adhesive patch 316 can comprise a hook and loop material with a complementary hook and loop material disposed on the surface 814 of the UAV 110. Regardless of the configuration, the adhesive strength between the adhesive patch 316 and the surface 814 is preferably strong enough to pull open the parachute canopy 208, but weak enough to release under the weight of the package. In this manner, the opening of the parachute canopy is expedited, yet there is no static line 216 to retrieve and/or dispose of.

As shown in FIG. 9, examples of the present disclosure can also comprise a method 900 for preparing a package for shipment by a UAV. As shown, because the planform of the shipping label parachute system 104 is substantially similar to that of a conventional shipping label, much of the shipping and handling process for a package can remain unchanged from convention practices. At 902, for example, the item(s) 904 to be delivered can be placed in the shipping container 106. Of course, the size of the shipping container 106 can be determined based on the size and weight of the item(s) 904. In some examples, a variety of shipping containers 106 with predetermined size and weight constraints can be paired with appropriately sized shipping label parachute systems 104 (and thus, parachute systems 206).

At 906, appropriate packing material 908 can be placed in the shipping container 106 with the item(s) 904. In some examples, the packing material 908 can comprise conventional packing materials such as, for example, "packing peanuts," inflatable bladders, foam, or Styrofoam sheets. In other examples, the packing materials 908 can be selected based on the parachute system 206 employed. In other words, the packing materials 908 can be chosen to match the rates descent rate of a particular parachute system 206. In this manner, the packing materials 908 and the parachute system 206 can comprise a complementary system for protecting the item(s) 904 during delivery. In some examples, different packing materials can be used for delivery by UAV than by conventional delivery methods.

At 910, the shipping container 106 can be sealed in an appropriate manner using, for example, tape and the shipping label parachute system 104 can be applied to the shipping container 106. Because the shipping label parachute system 104 has a similar planform to a conventional shipping label (i.e., one that provides, for example, a bill of lading or address information), it can be applied to the shipping container 106 in a conventional manner. When the shipping label parachute system 104 has an adhesive backing, for example, the user can simply remove the protective sheet 302 (e.g., waxed paper) and apply the shipping label parachute system 104 to the shipping container 106.

At 912, the user can determine the appropriate mode of delivery. If the weather is unfavorable for delivery by UAV 110, for example, the user may choose to deliver the package by conventional means such as, for example, by truck 914. Unfavorable conditions for delivery can include, for example, times of high demand, high winds, or heavy rain that make delivery by UAV 110 expensive, difficult, dangerous, or impossible. At 916, upon determining the mode of delivery, the shipping label 606 for the non-selected mode of delivery can be removed, with the applicable shipping label 608 left in place. In this manner, only information relevant to the chosen mode of delivery (e.g., by UAV 110) remains on the shipping container 106 to avoid confusion. In some examples, the shipping label 606 may include information related to both forms of shipment on a single label. In this configuration, removal of the "extra" shipping label is obviated.

At 918, the shipping container 106 can be attached to the UAV 110. As discussed above, this can be done using a number of appropriate means including, but not limited to, cargo hooks, cargo bays, pincers, mechanical arms, magnets, suction cups, or retractable shelves. At 920, the static line 216 (if used) can be attached to the hook 810 on the UAV 110. The package is now ready for delivery by the UAV 110.

Figure 10B:
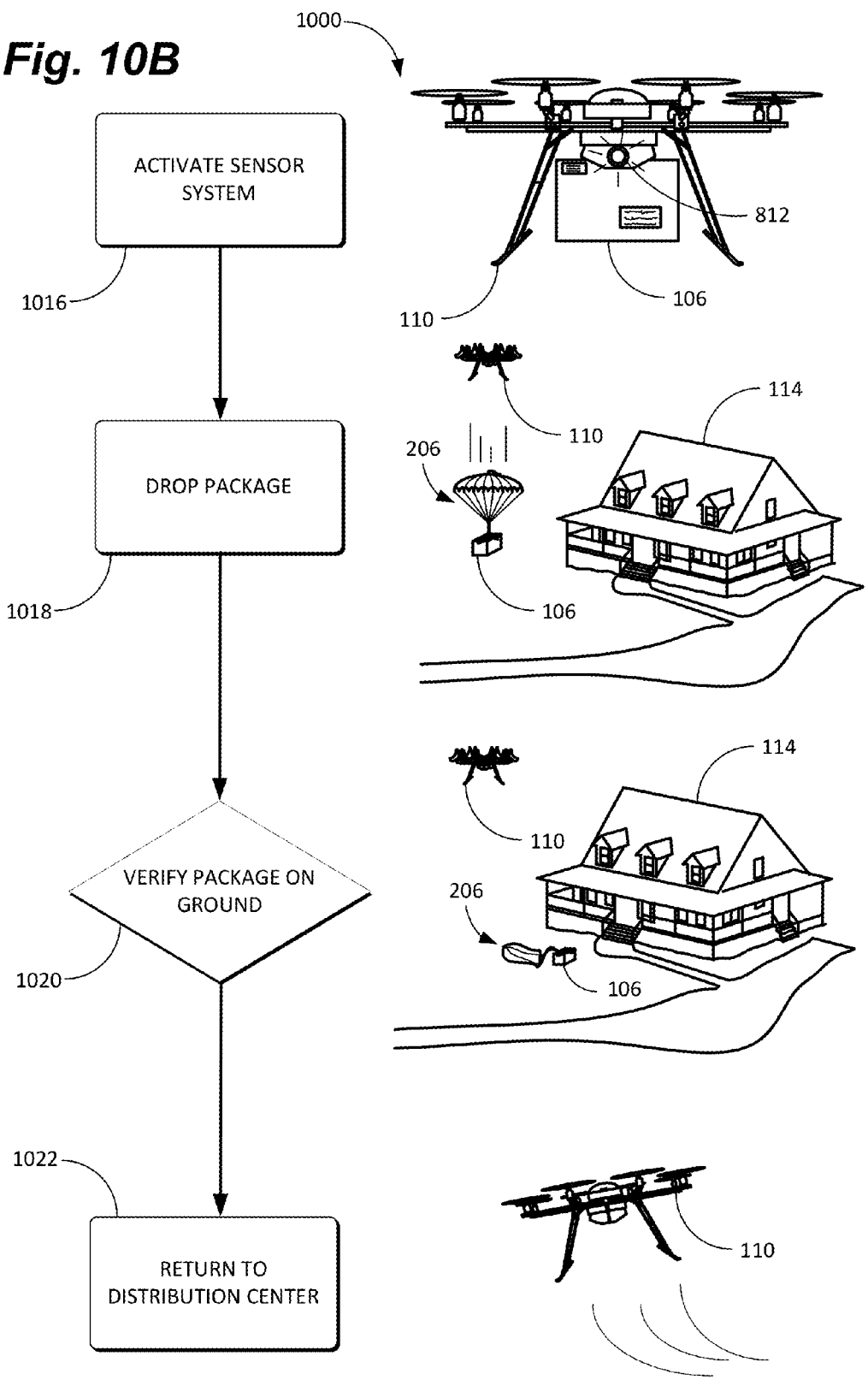

As shown in FIGS. 10A and 10B, examples of the present disclosure can also comprise a method 1000 for delivering a package via UAV. As shown in FIG. 10A, at 1002, the UAV 110, having been previously loaded with one or more shipping containers 106 can receive routing information from a central control 1004. In some examples, the central control 1004 can be connected via a wireless or wired connection to the UAV 110 to provide routing instructions. In some examples, as shown, the central control 1004 can be connected to the UAV 110 via a cellular connection 1006 to enable the central control 1004 and the UAV 110 to remain in communication during all, or most, of the UAVs 110 flight.

In some examples, the UAV 110 can include onboard navigation via cellular or global position system (GPS) signals, for example. In this configuration, the central control 1004 may simply send an address or GPS coordinates to the UAV 110. In this configuration, the UAV 110 can be capable of flying the received route autonomously or semi-autonomously. In other examples, the navigational computations may be provided by the central control 1004, with the central control 1004 providing "turn-by-turn" directions to the UAV 110.

At 1008, the UAV 110 can activate its propulsion system and take off. At 1010, the UAV 110 can navigate the route from the distribution location (e.g., a distribution or shipping center) to the delivery location 114. As discussed above, the UAV 110 may navigate using, for example, cellular location services, GPS, the onboard sensors, or a combination thereof. In some examples, the UAV 110 may provide status updates to the central control 1004 and/or receive location updates from the central control 1004 en route.

At 1012, the UAV 110 can determine if it has reached the delivery location 114. In some examples, the UAV 110 can verify that it has reached the delivery location 114 using cellular location or GPS coordinates. In other examples, the UAV 110 can periodically send its current location to the central control 1004. In this configuration, the central control 1004 can provide directions to the UAV 110 and inform the UAV 110 when it has reached the delivery location 114. In some examples, the UAV 110 can determine (or verify) it has reached the delivery location 114 using the sensor system 812. This can include viewing local signage and/or the address on a house or mailbox with an onboard camera, for example.

As shown in FIG. 10B, at 1016, the UAV 110 can activate the sensor system 812 (if it is not already active) to record the descent of the package from the UAV 110 to the ground at the delivery location 114. As discussed above, this can include recording video footage, including stereoscopic video footage, of the package as it descends from the UAV 110. The descent of the package may also be measured using radar, sonar, or other sensors, as desired, to provide additional data. In some examples, the sensor system 812 may be activated during the entire flight.

The descent of the shipping container 106 can be recorded to provide information related to, for example, the deployment of the parachute system 206, the descent speed, direction, and spin. The descent of the shipping container 106 can be recorded to verify the landing location at attitude of the shipping container 106 and to ensure that the shipping container 106 did not collide with people, vehicles, or other objects on the ground. This can be useful to determine if damage reported to the shipping container 106 (or contents 904) or by the shipping container 106 is valid, to determine the cause, and to take remedial action, as necessary.

At 1018, the UAV 110 can drop the package. In some examples, the UAV 110 may ascend or descend to a predetermined height to drop the shipping container 106 to ensure proper parachute system 206 deployment. In some examples, different sized parachute systems 206 may have different minimum height requirements based on the size of the parachute canopy 208, the weight of the shipping container 106, wind conditions, etc. As discussed above, dropping the shipping container 106 may also cause the deployment of the parachute system 206 via the static line 216. The sensor system 812 can monitor the descent of the shipping container 106 from the UAV 110 to the ground at the delivery location 114.

At 1020, in some examples, the UAV 110 can verify that the shipping container 106 is safely on the ground. This can include verifying zero velocity using the sensor system 812, for example, or by verifying that the parachute canopy 208 is lying slack on the ground. In some examples, the UAV 110 may send sensor data or pictures to the central control 1004 for verification by a central control 1004 computer or worker.

In some examples, the UAV 110 and/or the central control 1004 can compare the current altitude of the UAV 110 and the distance from the UAV 110 to the shipping container 106 to ensure the shipping container 106 has safely reached the ground. If the shipping container 106 has been caught in a tree or landed on the roof, for example, the UAV 110 can determine that the shipping container 106 is still above ground level and send a message to the central control 1004.

The message can enable the central control 1004 to log an anomaly and/or send support staff to the delivery location 114 to retrieve or reposition the package, as necessary. This can also enable the support staff to assess any damage to the shipping container 106 and/or the delivery location 114 and proactively take appropriate action. In some examples, the sensor system 812 can also verify that the shipping label parachute system 104 is facing up, indicating that the shipping container 106 has landed upright. This may be done by verifying that the backing sheet 202, for example, is visible from the UAV 110 and facing up. At 1022, the UAV 110 can return to the distribution center.

As shown in FIGS. 11A-11C, in some examples, the shipping label parachute system 104 can comprise a plurality of sizes. As shown, the shipping label parachute system 104 can comprise a small 104a, medium 104b, and large 104c shipping label for shipping small, medium, and large packages, respectively. In this manner, the size of the shipping label parachute system 104 can be adjusted based on the size of the required parachute system 206, the area required to secure the shipping label parachute system 104 to the shipping container 106 (i.e., via the backing sheet 202), or other factors. In some examples, the weight and/or size constraints for the largest shipping label 104c, for example, can be based on the size and/or weight constraints of the UAV 110. In this manner, packages that are too heavy or large to be delivered by UAV 110 can be identified and shipped via alternative modes of transportation.

As shown, each shipping label parachute system 104a, 104b, 104c can be associated with a related parachute system 206a, 206b, 206c, respectively. In this manner, the size of the parachute system 206 can be indicated by the size of the exterior of the shipping label parachute system 104. This can enable users to readily identify the different size and capacity shipping label parachute systems 104. In some examples, the size of the parachute system 206 may also dictate whether a harness 212 is used (FIGS. 11B and 11C) or not (FIG. 11A). As mentioned above, the harness 212 may be desirable to prevent tangling on larger parachute systems 106b, 106c, for example, but may be unnecessary for smaller parachute systems 106a. Similarly, smaller parachute systems 206a, for example, may not require a static line 216, or may use the adhesive static system 218, discussed above.

In some examples, each shipping label parachute system 104 can be associated with one or more matching shipping containers 106. In this manner, each box, or group of boxes, and the respective shipping label parachute system 104 have the same weight and/or size requirements. In this manner, if the item 904 to be shipped meets the size and weight requirement for the shipping container 106, it can also be safely delivered with the related shipping label parachute system 104. In this manner, the selection of the proper shipping label parachute system 104—and the proper parachute system 206—is simplified. In some examples, the shipping label parachute system 104 may be preinstalled on the appropriate shipping containers 106 to avoid mismatches.

In some examples, as shown, the small shipping label 104a can have a smaller planform than the medium 104b and large 104c shipping labels. In this manner, the shipping label parachute system 104, and their respective parachute systems 206, can be identified by the size of the shipping label parachute system 104. In other examples, larger parachute systems 206 can be folded such that all parachute systems 206 fit inside shipping label parachute system 104 of the same dimensions (albeit somewhat thicker). In some examples, the different sized shipping label parachute systems 104 may be color-coded, conspicuously labeled, or otherwise identified.

In some examples, the size of the shipping label parachute system 104 can be determined based on a predetermined, maximum landing speed for the shipping container 106. In other words, different items 904 and packing materials 908 may require different landing speeds to avoid damage. On the one extreme, a baseball or a towel packed in a shipping container 106, for example, could probably be dropped without a parachute (or with a very small parachute) though the shipping container 106 may be damaged. On the other extreme, pottery or wine glasses may require relatively low landing speeds to prevent breakage, regardless of the shipping container 106 and packing material 908.

The predetermined landing speed for a shipping container 106 can be determined based on, for example, the shock absorbing properties and strength of the shipping container 106 and packing materials 908, coupled with the strength (or fragility) of the items 904 in the shipping container 106. In some examples, the shipping container 106, packing materials 908, and shipping label parachute system 104 can be matched such that the landing speed of the shipping container 106 is lower than the predetermined landing speed for any stocked item 904 that can be shipped in that shipping container 106. In other examples, the predetermined landing speed (or maximum g-force) for each item 904 to be shipped can be determined experimentally to enable an appropriate shipping label parachute system 104, shipping container 106, and packing material 908 "system" to be determined for each item 904.

Figure 12:
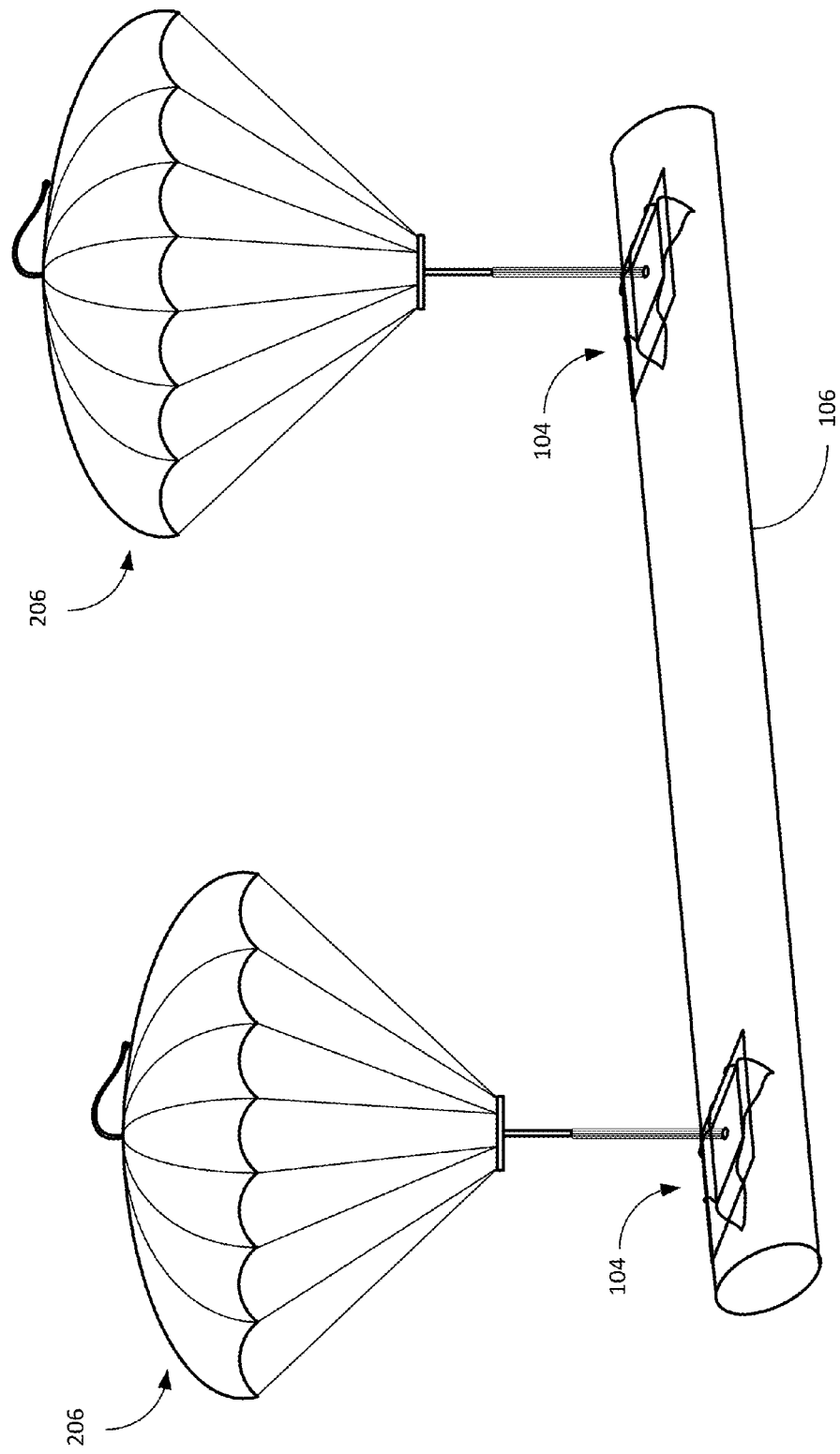
FIG. 12 is a front, perspective view of a large package with multiple shipping label parachute systems, in accordance with some examples of the present disclosure.

As shown in FIG. 12, in some examples, more than one shipping label parachute system 104 can be used. This can be useful for particularly heavy, large, or awkward shipping container 106. Heavy shipping container 106, for example, may simply exceed the weight limit for the largest shipping label parachute system 104; and thus, may require more than one parachute system 206 to provide safe descent. In other examples, as shown, the shipping container 106 may be a shipping tube, or similar, that would otherwise dangle or spin precariously from a single parachute system 206.

In some examples, when multiple shipping label parachute systems 104 are used, the shipping label parachute systems 104 can be placed at a predetermined distance from one another to substantial prevent the multiple parachute systems 206 from interfering with one another. In other words, the shipping label parachute systems 104 can be placed at sufficient distance from one another to prevent entanglement of the respective parachute cords 210, impingement of one canopy 208 on another, etc. In other examples, such as when a shipping container 106 is only slightly over the weight limit for a single shipping label parachute system 104, for example, interaction between the two shipping label parachute systems 104 may be inconsequential.

While several possible examples are disclosed above, examples of the present disclosure are not so limited. For instance, while a system is described primarily for use with UAVs, the system could also be used in conjunction with airplanes, helicopters, and other aerial vehicles. In addition, the location and configuration of various features of examples of the present disclosure such as, for example, the static line hook on the UAV, the type of harness used on the parachute, or the type and location of adhesives on the backing sheet can be varied according to a particular parachute system, UAV, shipping container, or by weight and/or size constraints placed in the system. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system to deliver a package via an unmanned aerial vehicle (UAV), the system comprising:
    a shipping container to house an item to be delivered; and
    a shipping label parachute system coupled to the shipping container, the shipping label parachute system comprising:
        a base sheet having a first side and a second side, wherein the second side is coupled to the shipping container;
        a transparent breakaway cover having a first side and a second side, wherein at least a portion of the second side is coupled to the first side of the base sheet such that the base sheet and the breakaway cover form a pocket;
        a parachute canopy, disposed in the pocket in a stowed position, the parachute canopy sized and shaped to slow the shipping container, during a free-fall descent, to a speed equal to, or less than, a predetermined landing speed when the shipping container is dropped from the UAV;
        a plurality of parachute cords, each with a first end and a second end, the first ends of the parachute cords coupled to the parachute canopy and the second ends of the parachute cords at least partially disposed between the second side of the base sheet and the shipping container; and
        a data label detachably coupled to, or printed on, the parachute canopy and visible through the first side of the breakaway cover in the stowed position, including information associated with shipping the package.

2. The system of claim 1, wherein the second side of the base sheet further comprises an adhesive to couple the shipping label parachute system to the shipping container.

3. The system of claim 1, further comprising one or more straps to couple the shipping label parachute system to the shipping container.

4. The system of claim 1, further comprising:
    a static line, with a first end and a second end, the first end of the static line coupled to the parachute canopy and the second end of the static line coupleable to the UAV;
    wherein at least a portion of the static line protrudes through an aperture in the breakaway cover in the stowed position.

5. The system of claim 1, wherein the data label comprises one or more of an address or GPS coordinates associated with a shipping location for the package.

6. The system of claim 1, wherein the data label comprises one or more of a quick response (QR) code or a bar code.

7. A parachute shipping label comprising:
    a base sheet having a first side and a second side, the first side of the base sheet coupleable to a shipping container;
    a transparent breakaway cover having a first side and a second side, a portion of the first side of the breakaway cover coupled to a portion of the second side of the base sheet such that the base sheet and the breakaway cover form a pocket;
    a parachute canopy, sized and shaped to be disposed in the pocket in a stowed position;
    a plurality of parachute cords, each with a first end and a second end, the first ends of the parachute cords coupled to the parachute canopy and the second ends of the parachute cords coupled to a portion of the base sheet; and a data label detachably coupled to, or printed on, the parachute canopy and visible through the first side of the breakaway cover in the stowed position, including information associated with shipping the package.

8. The parachute shipping label of claim 7, wherein the base sheet further comprises an adhesive applied to the first side of the base sheet to attach the parachute shipping label to the shipping container;

wherein the second ends of the plurality of parachute cords are inserted through an aperture in the base sheet and affixed to the adhesive.

9. The parachute shipping label of claim 8, further comprising:

a removable protective sheet disposed over the second ends of the plurality of parachute cords and the adhesive.

10. The parachute shipping label of claim 8, wherein the second ends of the plurality of parachute cords are disposed in a substantially spiral-shaped pattern on the adhesive.

11. The parachute shipping label of claim 8, wherein the second ends of the plurality of parachute cords are disposed in a substantially radial pattern on the adhesive.

12. The parachute shipping label of claim 7, further comprising:

a shock absorber, with a first end and a second end, the first end of the shock absorber coupled to the second ends of the plurality of parachute cords and the second end of the shock absorber coupled to a portion of the base sheet.

13. The parachute shipping label of claim 7, further comprising:

a shock absorber disposed between the first ends and the second ends of the plurality of parachute cords.

14. The parachute shipping label of claim 7, wherein the breakaway cover further comprises:

one or more perforated lines to enable the breakaway cover to open upon deployment of the parachute canopy.

15. The parachute shipping label of claim 7, wherein the parachute canopy further comprises:

one or more patterns formed on the parachute canopy to enable at least one of a descent speed, distance, and spin of the parachute canopy to be determined.

16. The parachute shipping label of claim 7, further comprising:

a harness disposed between the first ends and the second ends of the plurality of parachute cords to substantially prevent at least one of tangling of the plurality of parachute cords and spinning of the parachute canopy with respect to the shipping container.

17. A method comprising:

inserting a portion of a plurality of parachute cords through an aperture in a base sheet;

adhering the portion of the plurality of parachute cords to an adhesive sheet located on a first side of the base sheet;

applying a removable backing sheet over the portion of the plurality of parachute cords and the adhesive sheet;

placing a folded parachute canopy on a second side of the base sheet;

adhering at least a portion of a first side of a transparent breakaway cover to the second side of the base sheet to enclose the parachute canopy; and providing a data label detachably coupled to, or printed on, the parachute canopy and visible through the first side of the breakaway cover, including information associated with shipping the package.

18. The method of claim 17, further comprising:

attaching a first end of a static line to a portion of the folded parachute canopy; and inserting a second end of the static line through a second aperture in the breakaway cover from the first side to a second side.

19. The method of claim 17, further comprising:

perforating a portion of the first side, a second side, or both of the breakaway cover to facilitate deployment of the parachute canopy.

20. The method of claim 17, further comprising:

printing one or more identifying features on the parachute canopy;

wherein at least one of the one or more identifying features is visible through the breakaway cover in a stowed position.

* * * * *